(12) United States Patent
Kim

(10) Patent No.: US 12,096,242 B2
(45) Date of Patent: Sep. 17, 2024

(54) METHOD AND APPARATUS FOR REDUCING INTERFERENCE EFFECTS IN WIRELESS COMMUNICATION SYSTEMS

(71) Applicant: LG ELECTRONICS INC., Seoul (KR)

(72) Inventor: Insu Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 330 days.

(21) Appl. No.: 17/648,352

(22) Filed: Jan. 19, 2022

(65) Prior Publication Data
US 2023/0232249 A1 Jul. 20, 2023

(51) Int. Cl.
*H04W 16/28* (2009.01)
*H04B 17/318* (2015.01)
*H04B 17/336* (2015.01)
*H04W 24/10* (2009.01)

(52) U.S. Cl.
CPC .......... *H04W 16/28* (2013.01); *H04B 17/318* (2015.01); *H04B 17/336* (2015.01); *H04W 24/10* (2013.01)

(58) Field of Classification Search
None
See application file for complete search history.

(56) References Cited

U.S. PATENT DOCUMENTS

| | | | |
|---|---|---|---|
| 6,970,722 B1 * | 11/2005 | Lewis | H01Q 3/42 455/562.1 |
| 2002/0061768 A1 * | 5/2002 | Liang | H04B 7/0617 455/562.1 |
| 2002/0181629 A1 * | 12/2002 | Shibata | H04B 7/086 375/347 |
| 2012/0183149 A1 * | 7/2012 | Hiroe | G10L 25/48 381/56 |

(Continued)

FOREIGN PATENT DOCUMENTS

WO   WO2018009516   * 1/2018

*Primary Examiner* — Andre Tacdiran
(74) *Attorney, Agent, or Firm* — LEE, HONG, DEGERMAN, KANG & WAIMEY

(57) ABSTRACT

The present disclosure may provide a method for operating a UE in a wireless communication system. Herein, the UE may include: receiving information on a beam pattern from a base station; generating measurement information based on the information on the beam pattern; transmitting the measurement information to the base station; receiving beam pattern information based on the measurement information from the base station; and forming a beam based on the received beam pattern information, wherein the information on the beam pattern includes a null region search request for ordering to perform measurement in order to obtain information necessary to form a null in the beam pattern, the measurement information is measurement information for a null region, which is generated after a search and measurement for the null region is performed based on the null region search request, the beam pattern information (Continued)

includes a null forming indication based on the measurement information, and the null region is a section of the beam pattern, which is classified in the beam pattern according to a random value set by the base station.

11 Claims, 28 Drawing Sheets

(56) References Cited

U.S. PATENT DOCUMENTS

| | | | | |
|---|---|---|---|---|
| 2014/0003270 A1* | 1/2014 | Maltsev | ............... | H04W 52/34 |
| | | | | 370/252 |
| 2016/0161604 A1* | 6/2016 | Clark | ................... | G01S 13/424 |
| | | | | 342/154 |
| 2020/0059290 A1* | 2/2020 | Pan | ...................... | H04W 24/10 |
| 2020/0280377 A1* | 9/2020 | Haustein | ............ | H04B 17/0085 |
| 2021/0377906 A1* | 12/2021 | Bao | .................... | H04W 64/006 |
| 2022/0086713 A1* | 3/2022 | Määttänen | ............ | H04W 64/00 |
| 2023/0314127 A1* | 10/2023 | Takahashi | ............... | G01S 3/043 |
| | | | | 356/138 |

\* cited by examiner

METHOD AND APPARATUS FOR REDUCING INTERFERENCE EFFECTS IN WIRELESS COMMUNICATION SYSTEMS

BACKGROUND OF THE INVENTION

Field of the Invention

The present disclosure relates to a wireless communication system supporting full duplex radio (FDR) and, more particularly, to a method and apparatus for reducing interference effects by forming a null on a transmission/reception beam pattern in a wireless communication system.

Description of the Related Art

A wireless communication system refers to a multiple access system supporting communication with multiple users by sharing available system resources (e.g., bandwidth, transmit power, etc.). Examples of the multiple access system include a code division multiple access (CDMA) system, frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication method of establishing a direct link between user equipments (UEs) and directly exchanging voice or data between the UEs without a base station (BS). SL is being considered as a method of solving the burden of the base station according to rapidly increasing data traffic.

In addition, the base station may allocate resources for uplink signals or resources for downlink signals to the UE or a vehicle. The base station may allocate the resources for the uplink signals to the UE or the vehicle through uplink control information (UCI) or allocate the resources for the downlink signals to the UE or the vehicle through downlink control information (DCI).

Meanwhile, as more communication devices require larger communication capacity, there is a need for improved mobile broadband communication as compared to existing radio access technology (RAT). Therefore, a communication system considering a service or UE sensitive to reliability and latency is being discussed. Next-generation radio access technology considering massive machine type communication (MTC) or ultra-reliable and low latency communication (URLLC) may be referred to as new radio access technology (RAT) or new radio (NR).

SUMMARY

The present disclosure relates to a method and apparatus for reducing interference effects in a full-duplex radio (FDR) communication system.

The present disclosure relates to a method and apparatus for adjusting a beam pattern based on cross-link interference (CLI) in an FDR communication system.

The present disclosure relates to a method and apparatus for reducing an interference effect by forming a null on a beam pattern in an FDR communication system.

The present disclosure relates to a method and apparatus for exchanging, by a UE and a base station, a signal for forming a null on a beam pattern in an FDR communication system.

The technical objects to be achieved in the present disclosure are not limited to the above-mentioned technical objects, and other technical objects that are not mentioned may be considered by those skilled in the art through the embodiments described below.

In an embodiment of the present disclosure, a method for operating a UE in a wireless communication system may be provided. Herein, the UE may include: receiving information on a beam pattern from a base station; generating measurement information based on the information on the beam pattern; transmitting the measurement information to the base station; receiving beam pattern information based on the measurement information from the base station; and forming a beam based on the beam pattern information. Herein, the information on the beam pattern may include a null region search request for instructing to perform measurement for obtaining information that is necessary to form a null on the beam pattern, the measurement information may be measurement information on a null region that is generated after search and measurement are performed based on the null region search request, the beam pattern information may include a null forming indication based on the measurement information, and the null region may be an interval of the beam pattern, which is classified based on a random value that the base station sets in the beam pattern.

Also, in an embodiment of the present disclosure, a UE of a wireless communication system may include a transceiver and a processor coupled to the transceiver. Herein, the processor may be configured to receive information on a beam pattern from a base station, to generate measurement information based on the information on the beam pattern, to transmit the measurement information to the base station, to receive beam pattern information based on the measurement information from the base station, and to form a beam based on the beam pattern information. Herein, the information on the beam pattern may include a null region search request for instructing to perform measurement for obtaining information that is necessary to form a null on the beam pattern, the measurement information may be measurement information on a null region that is generated after search and measurement are performed based on the null region search request, the beam pattern information may include a null forming indication based on the measurement information, and the null region may be an interval of the beam pattern, which is classified based on a random value that the base station sets in the beam pattern.

Also, the following is commonly applicable to a UE and a UE operation method.

Also, in an embodiment of the present disclosure, the beam pattern may include at least one of a beam pattern transmitted by an aggressor UE and a beam pattern received by a victim UE.

Also, in an embodiment of the present disclosure, the null region measurement information may include at least one of an index indicating a null region (a null region index), a width of a null region (a null width), and an SINR value and a RSSI value for each null region.

Also, in an embodiment of the present disclosure, a null region search request of the base station may be transmitted to the UE based on a difference value between a signal to noise ratio (SNR) and a signal to interference plus noise ratio (SINR) for a received signal of the UE.

Also, in an embodiment of the present disclosure, the null region measurement information may be generated after the null region search is performed based on a calculated value of a weight for forming a null in a specific region of the beam pattern.

Also, in an embodiment of the present disclosure, the null region measurement information may be generated by a victim UE based on an effect of a signal that an aggressor UE including cross link interference (CLI) transmits.

Also, in an embodiment of the present disclosure, the null region may be determined by the base station based on at least one of beam information of an aggressor UE and location information between the aggressor UE and a victim UE.

Also, in an embodiment of the present disclosure, the null forming indication may include at least one of a null region index and information on a start point and an end point of a region in which a null is to be formed.

Also, in an embodiment of the present disclosure, the null forming indication may be determined based on at least one of a RSSI value and an SINR value, which are measured in the each null region of the beam pattern.

Also, in an embodiment of the present disclosure, a method for operating a base station in a wireless communication system may be provided. Herein, the method for operating the base station may include: transmitting information on a beam pattern to a UE; receiving, from the UE, measurement information generated based on the information on the beam pattern; and transmitting, to the UE, beam pattern information based on the received measurement information. Herein, the information on the beam pattern may include a null region search request for instructing to perform measurement for obtaining information that is necessary to form a null on the beam pattern, the measurement information may be measurement information on a null region that is generated after search and measurement are performed based on the null region search request, the beam pattern information may include a null forming indication based on the measurement information, and the null region may be an interval of the beam pattern, which is classified based on a random value that the base station sets in the beam pattern.

The above-described aspects of the present disclosure are only a part of the preferred embodiments of the present disclosure, and various embodiments reflecting technical features of the present disclosure may be derived and understood by those skilled in the art on the basis of the detailed description of the present disclosure provided below.

The following effects may be produced by embodiments based on the present disclosure.

According to the present disclosure, communication quality may be improved by reducing interference effects in a full-duplex radio (FDR) communication system.

According to the present disclosure, communication performance may be improved by adjusting a beam pattern based on cross link interference (CLI) in an FDR communication system.

According to the present disclosure, it is possible to provide a method and apparatus for reducing an interference effect by forming a null on a beam pattern in an FDR communication system.

According to the present disclosure, communication quality may be improved by providing a method and apparatus for exchanging, by a UE and a base station, a signal for forming a null on a beam pattern in an FDR communication system.

Effects obtained in the present disclosure are not limited to the above-mentioned effects, and other effects not mentioned above may be clearly derived and understood by those skilled in the art, to which a technical configuration of the present disclosure is applied, from the following description of embodiments of the present disclosure. That is, effects, which are not intended when implementing a configuration described in the present disclosure, may also be derived by those skilled in the art from the embodiments of the present disclosure.

BRIEF DESCRIPTION OF THE DRAWINGS

The accompanying drawings are provided to aid understanding of the present disclosure, and embodiments of the present disclosure may be provided together with a detailed description. However, the technical features of the present disclosure are not limited to a specific drawing, and features disclosed in each drawing may be combined with each other to constitute a new embodiment. Reference numerals in each drawing may mean structural elements.

DETAILED DESCRIPTION

Figure 1:
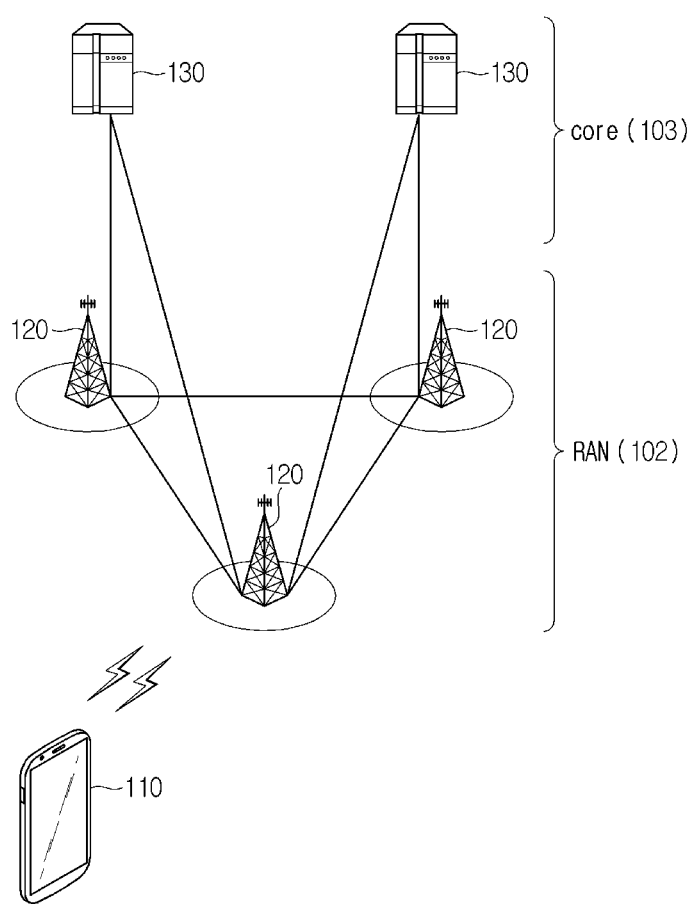
FIG. 1 illustrates the structure of a wireless communication system according to an embodiment of the present disclosure.

The following embodiments are achieved by combination of structural elements and features of the present invention in a predetermined manner. Each of the structural elements or features should be considered selectively unless specified separately. Each of the structural elements or features may be carried out without being combined with other structural elements or features. Also, some structural elements and/or features may be combined with one another to constitute the embodiments of the present disclosure. The order of operations described in the embodiments of the present disclosure may be changed. Some structural elements or features of one embodiment may be included in another embodiment, or may be replaced with corresponding structural elements or features of another embodiment.

In the description of the drawings, procedures or steps which render the scope of the present invention unnecessarily ambiguous will be omitted and procedures or steps which can be understood by those skilled in the art will be omitted.

In the entire specification, when a certain portion "comprises" or "includes" a certain component, this indicates that the other components are not excluded, but may be further included unless specially described. The terms "unit", "-or/er" and "module" described in the specification indicate a unit for processing at least one function or operation, which may be implemented by hardware, software and a combination thereof. In addition, "a or an", "one", "the" and similar related words may be used as the sense of including both a singular representation and a plural representation unless it is indicated in the context describing the present specification (especially in the context of the following claims) to be different from this specification or is clearly contradicted by the context.

In the present specification, "A or B" may mean "only A", "only B" or "both A and B". In other words, in the present specification, "A or B" may be interpreted as "A and/or B". For example, in the present specification, "A, B or C" may mean "only A, "only B", "only C" or "any combination of A, B and C".

A slash (/) or comma used in the present specification may mean "and/or". For example, "A/B" may mean "A and/or B". Therefore, "A/B" may mean "only A", "only B" or "both A and B". For example, "A, B, C" may mean "A, B or C".

In the present specification, "at least one of A and B" may mean "only A", "only B" or "both A and B". In addition, in the specification, "at least one of A or B" or "at least one of A and/or B" may be interpreted as being the same as "at least one of A and B".

In addition, in the present specification, "at least one of A, B and C" may mean "only A", "only B", "only C" or "any combination of A, B and C". In addition, in the specification, "at least one of A, B or C" or "at least one of A, B and/or C" may be interpreted as being the same as "at least one of A, B and C".

In addition, parentheses used in the present specification may mean "for example". Specifically, when "control information (PDCCH)" is described, "PDCCH" may be proposed as an example of "control information". In other words, "control information" of the present specification is not limited to "PDCCH" and "PDCCH" may be proposed as an example of "control information". In addition, even when "control information (that is, PDCCH)" is described, "PDCCH" may be proposed as an example of "control information".

In the following description, "when, if or in case of" may be replaced with "based on".

In this specification, technical features individually described in one drawing may be implemented individually or simultaneously.

In this specification, a higher layer parameter may be set for a user equipment (UE), preset or predefined. For example, a base station or a network may transmit a higher layer parameter to a UE. For example, the higher layer parameter may be transmitted through radio resource control (RRC) signaling or medium access control (MAC) signaling.

The following technology can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc. IEEE 802.16m is an evolution of IEEE 802.16e and provides backward compatibility with a system based on IEEE 802.16e. UTRA is a part of Universal Mobile Telecommunications System (UMTS). Third generation partnership project (3GPP) long term evolution (LTE) is a part of Evolved UMTS (E-UMTS) using E-UTRA, adopting OFDMA for DL and SC-FDMA for UL. LTE-Advanced (LTE-A) is an evolution of 3GPP LTE.

5G NR is subsequent technology of LTE-A and is a new clean-state mobile communication system having features such as high performance, low latency and high availability. 5G NR may utilize all available spectral resources such as low frequency bands of less than 1 GHz to intermediate frequency bands of 1 GHz to 10 GHz or high frequency (millimeter) bands of 24 GHz or higher.

5G NR is focused upon in order to clarify the description but the technical idea of an embodiment of the present disclosure is not limited thereto.

For terms and technologies which are not specifically described among terms and technologies used in this specification, reference may be made to the wireless communication standard document published before application of this specification. For example, 3GPP TS36.XXX, 3GPP TS37.XXX and 3GPP38.XXX documents may be referenced.

Communication System Applicable to the Present Disclosure

FIG. 1 illustrates the structure of a wireless communication system according to an embodiment of the present disclosure. The embodiment of FIG. 1 may be combined with various embodiments of the present disclosure.

Referring to FIG. 1, the wireless communication system includes a radio access network (RAN) 102 and a core network 103. The RAN 102 includes a base station 120 for providing a terminal 110 with a control plane and a user plane. The terminal 110 may be fixed or mobile and may be referred to as the other term such as user equipment (UE), mobile station (MS), subscriber station (SS), mobile subscriber station (MSS), mobile terminal or advanced mobile station (AMS), wireless device or the like. The base station 120 is a node for providing a radio access service to the terminal 110 and may be referred to as the other term such as a fixed station, a Node B, a eNode B (eNB), a gNode B (gNB), a ng-eNB, an advanced base station (ABS) or an access point (AP), a base transceiver system (BTS), or the like. The core network 103 includes a core network entity 130. The core network entity 103 may be variously defined according to the function and may be referred to as the other term such as a core node, a network node, a network equipment or the like.

The structural elements of the system may be referred to differently according to the applied system standard. In the case of LTE or LTE-A, the RAN 102 is an Evolved-UMTS Terrestrial Radio Access Network (E-UTRAN), and the core network 103 may be referred to as an evolved packet core (EPC). In this case, the core network 103 includes a mobility management entity (MME), a serving gateway (S-GW) and a packet data network-gateway (P-GW). The MME has access information of the terminal or information on the capabilities of the terminal, and such information is mainly used for mobility management of the terminal. The S-GW is a gateway with an E-UTRAN as an end point, and the P-GW is a gateway having a packet data network (PDN) as an end point.

In the case of the 5G NR standard, the RAN 102 is a NG-RAN, and the core network 103 may be referred to as a 5G core (5GC). In this case, the core network 103 includes an access and mobility management function (AMF), a user plane function (UPF), and a session management function (SMF). The AMF provides a function for access and mobility management of a terminal unit, the UPF performs a function for mutually transferring a data unit between a higher layer network and the RAN 102, and the SMF provides a session management function.

The base stations 120 may be connected to each other through an Xn interface. The base station 120 may be connected to the core network 103 through an NG interface. More specifically, the base station 120 may be connected to the AMF through an NG-C interface, and may be connected to the UPF through an NG-U interface.

Radio Resource Structure

Figure 2:
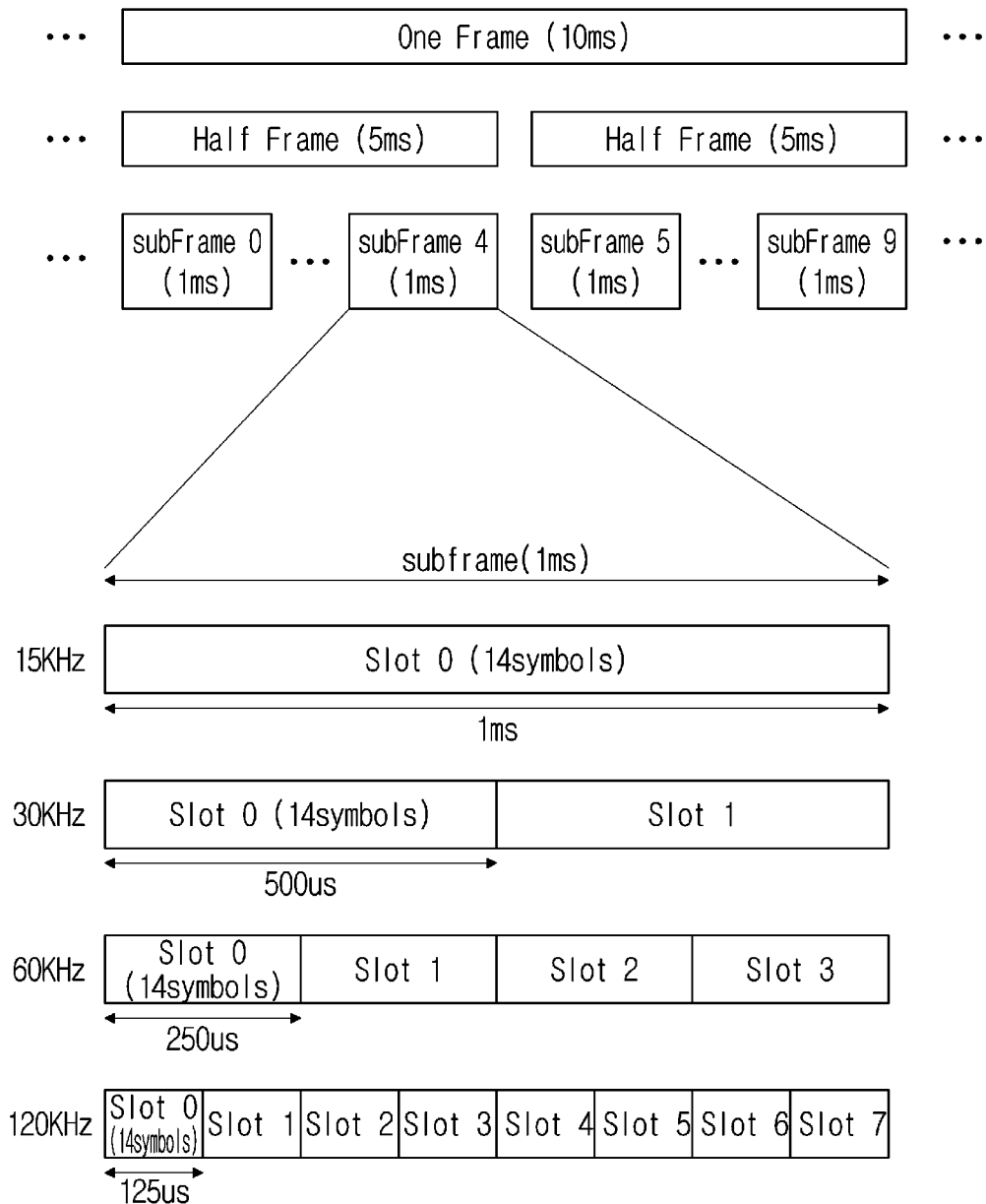
FIG. 2 illustrates the structure of a radio frame of NR according to an embodiment of the present disclosure.

FIG. 2 illustrates the structure of a radio frame of NR according to an embodiment of the present disclosure. The embodiment of FIG. 2 may be combined with various embodiments of the present disclosure.

Referring to FIG. 2, in NR, a radio frame may be used in uplink and downlink transmission. A radio frame has a length of 10 ms and may be defined as two 5-ms half-frames (HFs). The half-frame includes five 1-ms subframes (SFs). The subframe may be divided into one or more slots and the number of slots in the subframe may be determined according to a subscriber spacing (SCS). Each slot may include 12 or 14 OFDM(A) symbols according to a cyclic prefix (CP).

When a normal CP is used, each slot may include 14 symbols. When an extended CP is used, each slot may include 12 symbols. Here, the symbol may include an OFDM symbol (or a CP-OFDM symbol) and an SC-FDMA (Single Carrier-FDMA) symbol (or a DFT-s-OFDM (Discrete Fourier Transform-spread-OFDM) symbol).

When the normal CP is used, the number $N^{slot}_{symb}$ of symbols per slot, the number $N^{frame,u}_{slot}$ of frame and the number $N^{subframe,u}_{slot}$ of slots per subframe may vary according to the SCS configuration (u). For example, SCS (=15*2^u), $N^{slot}_{symb}$, $N^{frmae,u}_{slot}$, and $N^{subframe,u}_{slot}$ may be 15 KHz, 14, 10 and 1 in the case of u=0, may be 30 KHz, 14, 20 and 2 in the case of u=1, may be 60 KHz, 14, 40, 4 in the case of u=2, may be 120 KHz, 14, 80 and 8 in the case of u=3, and may be 240 KHz, 14, 160, 16 in the case of u=4. In contrast, when the extended CP is used, SCS(=15*2^u), $N^{slot}_{symb}$, $N^{frame,u}_{slot}$, and $N^{subframe,u}_{slot}$ and 60 KH_z, 12, 40 and 4 in the case of u=2. In the NR system, an OFDM(A) numerology (e.g., SCS, CP length, etc.) may be differently set among a plurality of cells merged into one terminal. Accordingly, the (absolute time) duration of time resources (e.g., a subframe, a slot or a TTI) (for convenience, collectively referred to as a time unit (TU)) consisting the same number of symbols may be differently set between merged cells.

In NR, a plurality of numerologies or SCS supporting various 5G services may be supported. For example, a wide area in typical cellular bands may be supported when SCS is 15 kHz, and dense-urban, lower latency and wider carrier bandwidth may be supported when SCS is 30 kHz/60 kHz. When SCS is 60 kHz or higher, bandwidth greater than 24.25 GHz may be supported in order to overcome phase noise.

The NR frequency band may be defined as two types of frequency ranges. The two types of frequency ranges may be FR1 and FR2. The numerical value of the frequency range may be changed and, for example, frequency ranges corresponding to FR1 and FR2 may be 450 MHz to 6000 MHz and 24250 MHz to 52600 MHz. In addition, the supported SCS may be 15, 30 and 60 kHz in the case of FR1, and may be 60, 120 and 240 kHz in the case of FR2. Among the frequency ranges used in the NR system, FR1 may mean "sub 6 GHz range", and FR2 may mean "above 6 GHz range" and may be called as millimeter wave (mmW).

As described above, the numerical value of the frequency range of the NR system may be changed. For example, as compared to the above-described example of the frequency range, FR1 may be defined as including a band of 410 MHz to 7125 MHz. That is, FR1 may include a frequency band of 6 GHz (or 5850, 5900, 5925 MHz, etc.) or higher. For example, a frequency band of 6 GHz (or 5850, 5900, 5925 MHz, etc.) included in FR1 may include an unlicensed band. The unlicensed band may be used for various purposes and may be used, for example, for vehicle communication (e.g., autonomous driving).

Figure 3:
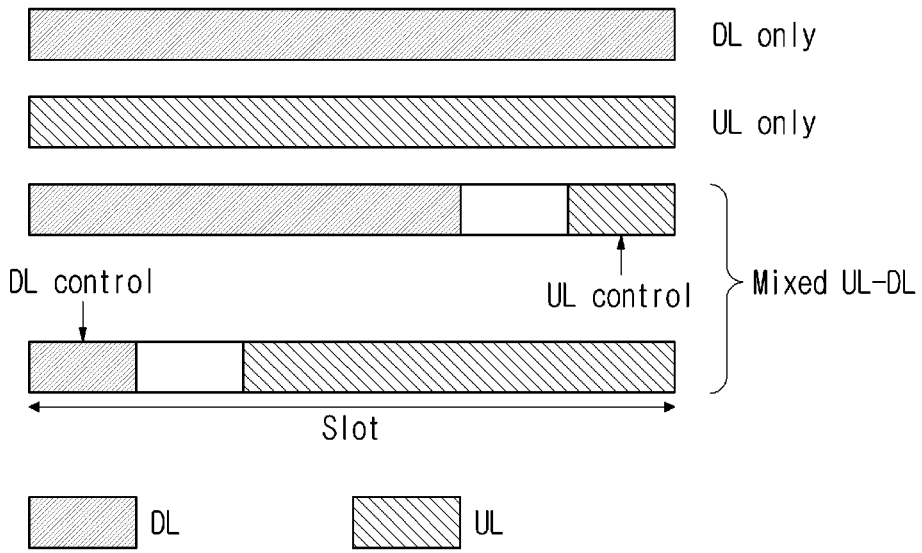
FIG. 3 illustrates the structure of a self-contained slot according to an embodiment of the present disclosure.

FIG. 3 illustrates the structure of a self-contained slot according to an embodiment of the present disclosure.

In the NR system, a frame is characterized by a self-contained structure in which a DL control channel, DL or UL data, a UL control channel, etc. may all be included in one slot. For example, the first N symbols in the slot may be used to transmit a DL control channel (hereinafter referred to as a DL control region) and the last M symbols in the slot may be used to transmit a UL control channel (hereinafter referred to as a UL control region). N and M are integers of 0 or more. A resource region (hereinafter referred to as a data region) between a DL control region and a UL control region may be used for DL data transmission or UL data transmission. For example, the following configurations may be considered. Durations was listed in chronological order.
1. DL only configuration
2. UL only configuration
3. Mixed UL-DL configuration
   DL region+GP (Guard Period)+UL control region
   DL control region+GP+UL region
   DL region: (i) DL data region, (ii) DL control region+DL data region
   UL region: (i) UL data region, (ii) UL data region+UL control region A PDCCH may be transmitted in the DL control region and a PDSCH may be transmitted in the DL data region. A PUCCH may be transmitted in the UL control region and a PUSCH may be transmitted in the UL data region. In the PDCCH, DCI (Downlink Control Information), for example, DL data scheduling information, UL data scheduling information, etc. may be transmitted. In the PUCCH, UCI, for example, ACK/NACK (Positive Acknowledgement/Negative Acknowledgement) information related to DL data, CSI (Channel State Information) information, SR (Scheduling Request), etc. may be transmitted. The GP provides a time gap in a process of switching a transmission mode to a reception mode or switching from a reception mode to a transmission mode in a base station (BS) and a UE. Some symbols at a point in time when DL is switched to UL within the subframe may be set as a GP.

Overview of FDR System and Interference Element in FDR

The FDR system enables simultaneous transmission and reception of uplink and downlink signals on the same frequency band. Accordingly, the FDR system may increase spectral efficiency up to two times that of the existing system for transmitting and receiving uplink and downlink signals by dividing a frequency or time and thus is being spotlighted as one of the core technologies of a next-generation mobile communication system.

From the viewpoint of any wireless device, an FDR technology using a single frequency transmission band may be defined as a transmission resource configuration method of simultaneously performing transmission and reception through a single frequency transmission band. As a special example thereof, the FDR technology may be represented as a transmission resource configuration method of simultaneously performing, for wireless communication between a general access node (e.g., a base station, a repeater, a relay node, a remote radio head (RRH), etc.) and a wireless terminal, downlink transmission and uplink reception of the base station and downlink reception and uplink transmission of the wireless UE through a single frequency transmission band. As another example, the FDR technology may be represented as a transmission resource configuration method of simultaneously performing transmission and reception between wireless UEs in the same frequency transmission band in a situation of device-to-device direct communication (D2D) between wireless UEs.

Hereinafter, although the present disclosure describes proposed technologies related to FDR such as wireless transmission and reception between a general base station and a wireless UE, various proposed embodiments are applicable to a network wireless device for performing wireless transmission and reception with a UE other than a general base station and direct UE-to-UE communication between UEs.

Figure 4:
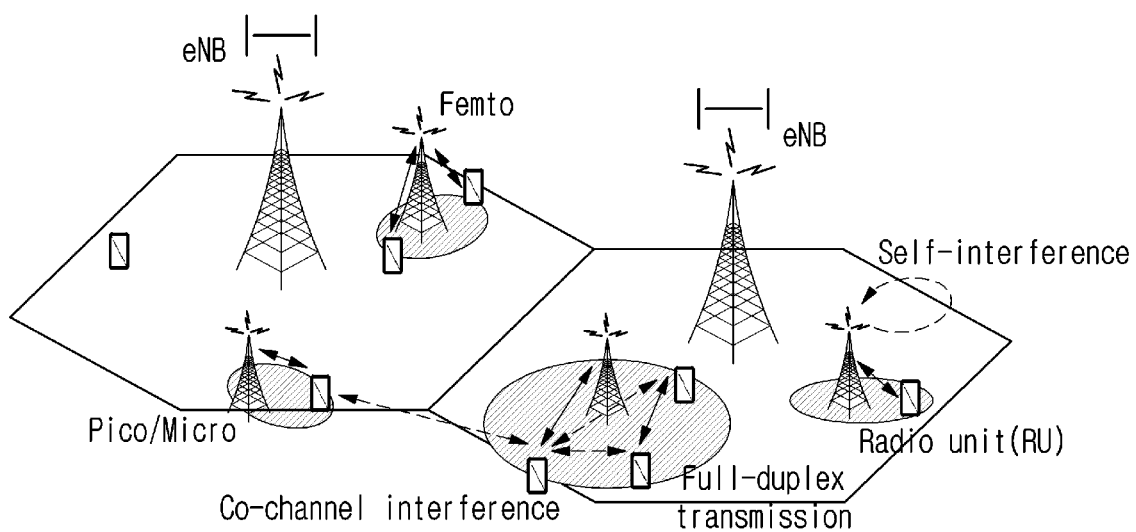
FIG. 4 illustrates the concept of a user equipment (UE) and a base station supporting full duplex radio (FDR) according to an embodiment of the present disclosure.

FIG. 4 illustrates the concept of a user equipment (UE) and a base station supporting full duplex radio (FDR) according to an embodiment of the present disclosure. In the FDR situation shown in FIG. 4, there may be a total of three types of interference as follows.

Intra-device self-interference: Since transmission and reception are performed using the same time and frequency resources, a device simultaneously receives not only a desired signal but also a signal transmitted by the device. In this case, the signal transmitted by the device is received by a receive antenna of the device with little attenuation and thus is received with much greater power than the desired signal, thereby acting as interference.

UE to UE inter-link interference: This means that an uplink signal transmitted by a UE is received by an adjacent UE, thereby acting as interference.

BS to BS inter-link interference: This means that a signal transmitted between BSs or heterogenous base stations (e.g., a picocell, a femtocell or a relay node) in a HetNet situation is received by a receive antenna of another base station, thereby acting as interference.

Among the above three types of interference, intra-device self-interference (SI) occurs only in the FDR system. The SI greatly degrades performance of the FDR system, which is treated as a first problem to be solved in order to operate the FDR system.

Figure 5:
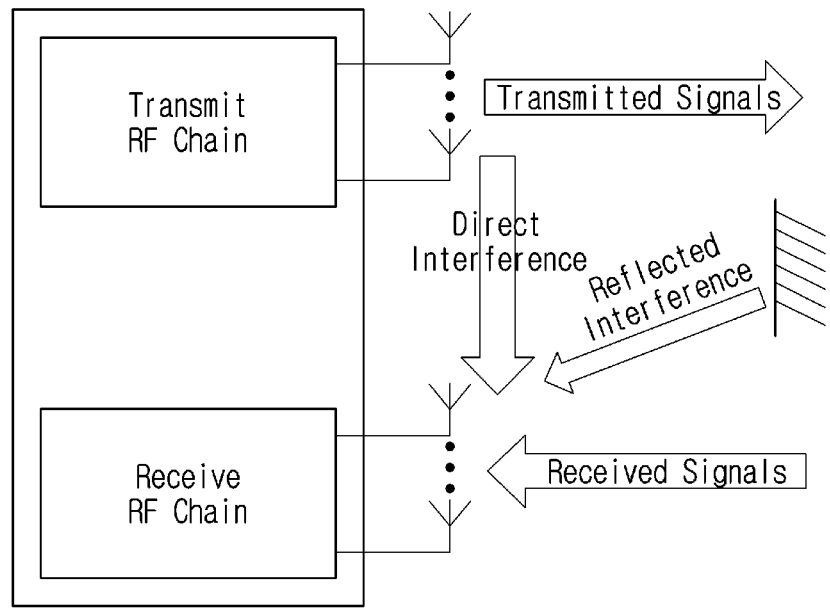
FIG. 5 illustrates an example of transmit/receive link and self-interference in a FDR communication situation according to an embodiment of the present disclosure.

FIG. 5 illustrates an example of transmit/receive link and self-interference in a FDR communication situation according to an embodiment of the present disclosure.

As shown in FIG. 5, SI may be classified into direct interference in which a signal transmitted by a transmit antenna directly enters a receive antenna without path attenuation and reflected interference reflected by a surrounding terrain. The intensity of the direct interference and the reflected interference is generally greater than that of the desired signal because of a difference in physical distance. Due to such a large intensity of interference, effective cancellation of SI is essential for operating the FDR system.

In order to efficiently operate the FDR system, requirements of self-interference cancellation (self-IC) according to maximum transmit power may be determined as shown in Table 1 below.

TABLE 1

| Node Type | Max. Tx Power ($P_A$) | Thermal Noise (BW = 20 MHz) | Receiver NF | Receiver Thermal Noise Level | Self-IC Target ($P_A$-TN-NP) |
|---|---|---|---|---|---|
| Macro eNB | 46 dBm | −101 dBm | 5 dB (for eNB) | −96 dBm | 142 dB |
| Pico eNB | 30 dBm | | | | 126 dB |
| Femto eNB, WLAN AP | 23 dBm | | | | 119 dB |
| UE | 23 dBm | | 9 dB (for UE) | −92 dBm | 115 dB |

According to the bandwidth of a mobile communication system, a thermal noise value may be determined by $N_{0,BW}$=−174 dBm+10×$\log_{10}$(BW), and Table 1 shows thermal noise on the assumption of bandwidth of 20 MHz. A receiver noise figure (NF) is an example of considering the worst case of the 3GPP standard requirements. A receiver thermal noise level may be determined by a sum of thermal noise in specific BW and receiver NF.

Referring to Table 1, it can be seen that self-interference cancellation performance of 119 dBm is required in order for a UE to efficiently drive the FDR system in bandwidth of 20 MHz. In order to obtain such self-interference cancellation performance, there are a total of three steps of self-interference cancellation techniques, which will be described below in detail.

antenna self-IC: This is a technique to be preferentially executed among all self-interference cancellation techniques, and SI cancellation is performed at an antenna end. As a simplest way, a material capable of blocking signals between transmit and receive antennas may be installed to physically block transmission of an SI signal, a distance between antennas may be intendedly controlled using multiple antennas or the phase of a specific transmitted signal may be inverted to cancel some SI signals. In addition, some SI signals may be canceled using a multi-polarized antenna or a directional antenna.

analog self-IC: This is a technique that cancels interference at an analog end before a received signal passes through an analog-to-digital converter (ADC) and cancels SI signals using a duplicated analog signal. This may be performed in an RF domain or an IF domain.

A method of cancelling an SI signal will be described below in detail. A transmitted analog signal is delayed in time and then a duplicated signal of the actually received SI signal may be generated by adjusting a magnitude and a phase thereof, and subtracted from a signal received by a receive antenna. However, since processing is performed using the analog signal, additional distortion may occur due to implementation complexity and circuit characteristics, thereby greatly changing interference cancellation performance.

digital self-IC: This is a technique that cancels interference after a received signal passes through an ADC and includes all interference cancellation techniques performed in a baseband domain. As a simplest way, a duplicated signal of SI may be generated using a transmitted digital signal and subtracted from a received digital signal. Alternatively, techniques for preventing a signal transmitted by a UE or a base station from being received by a receive antenna by performing precoding/postcoding in the baseband using multiple antennas may also be classified as digital self-interference cancellation.

However, since digital self-interference cancellation is feasible when a digitally modulated signal is quantized enough to restore information on a desired signal, there is a need for a precondition that a difference in signal power level between an interference signal remaining after cancelling interference using one or more of the above-described techniques and the desired signals is within an ADC range.

Figure 6:
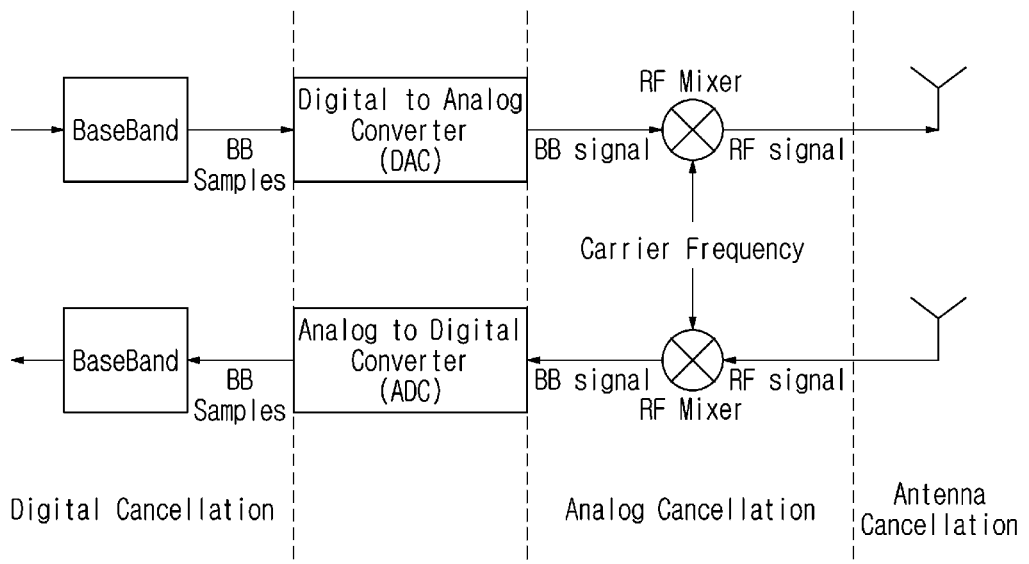
FIG. 6 illustrates a position, to which three interference techniques at a radio frequency (RF) front end is applied, according to an embodiment of the present disclosure.

Positions, to which the above-described three self-interference cancellation techniques are applied, are shown in FIG. 6. FIG. 6 illustrates positions, to which three interference techniques at a radio frequency (RF) front end is applied, according to an embodiment of the present disclosure. Referring to FIG. 6, antenna cancellation for performing antenna self-interference cancellation is applied to an antenna section, analog cancellation for performing analog self-interference cancellation is applied to a section including a mixer for converting a baseband signal into an RF signal, and digital cancellation for performing digital self-interference cancellation is applied to a section before digital-to-analog converter (DAC) input and after ADC output.

Figure 7:
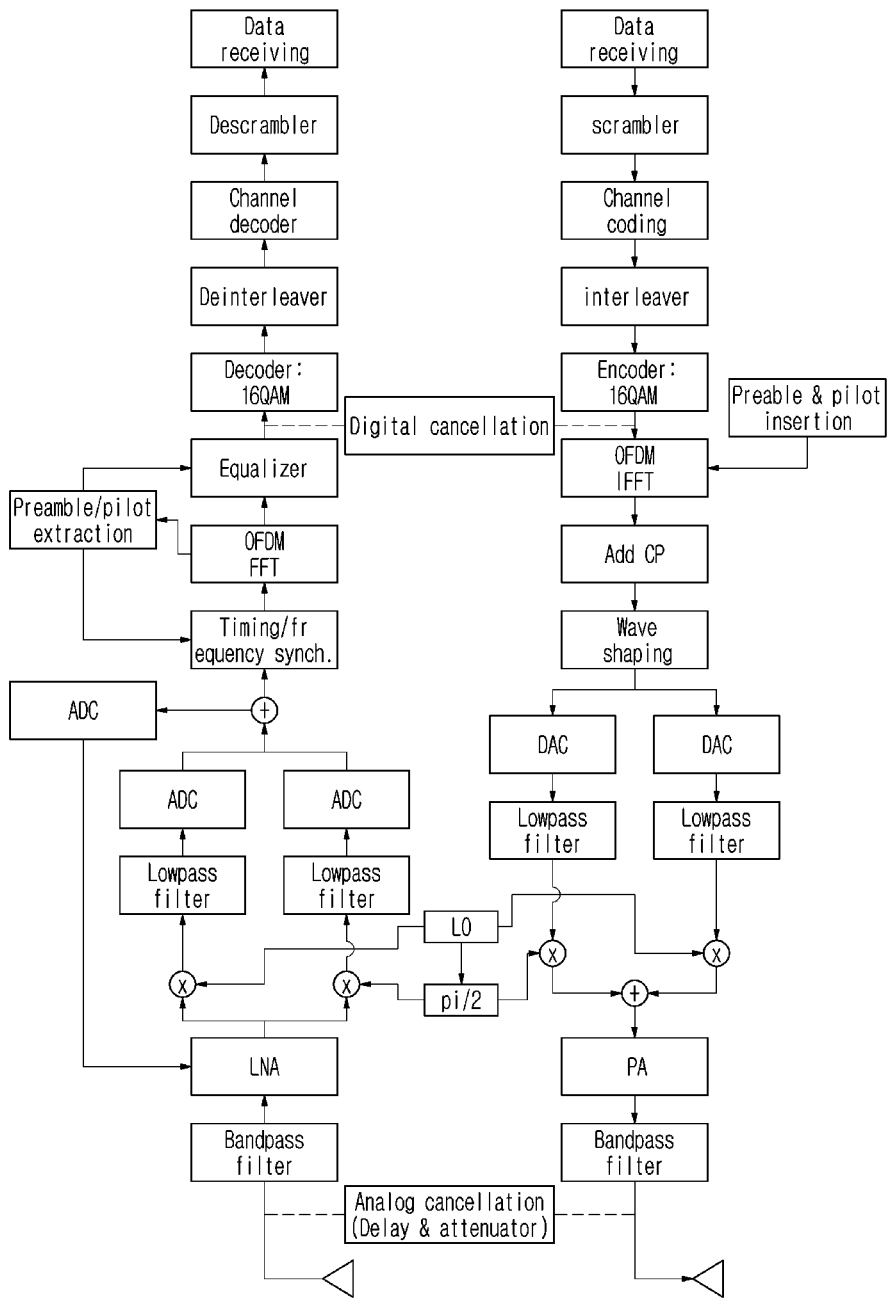
FIG. 7 illustrates the structure of a transceiver for self-interference cancellation in a communication device according to an embodiment of the present disclosure.

FIG. 7 illustrates the structure of a transceiver for self-interference cancellation in a communication device according to an embodiment of the present disclosure. In FIG. 7, a digital cancellation block for performing digital self-interference cancellation performs interference cancellation using digital self-interference signal (digital SI) before the DAC and after passing through the ADC. However, in another example, digital self-interference cancellation may be performed using a digital self-interference signal after passing through an IFFT and before passing through an FFT. In addition, although FIG. 7 shows a structure for canceling a self-interference signal by separating a transmit antenna and a receiver antenna, an antenna interference cancellation technique using one antenna may be used in another example. In this case, the antenna structure may be different from the example of FIG. 7. To this end, a function block suitable for a purpose may be further added or deleted.

Signal Modeling of FDR System

The FDR system uses the same frequency between the transmitted signal and the received signal and thus are greatly affected by non-linear components in RF. In particular, the transmitted signal may be distorted by the non-linear characteristics of active elements such as the power amplifier of a transmit RF chain and a low noise amplifier (LNA) of a receive RF chain, and distortion may also be caused by a mixer in the transmit and receive RF chains. Due to such distortion, the transmitted signal may be modeled as generating a high-order component. Among them, an even-order component is generated around direct current (DC) and in a high frequency region corresponding to several times a center frequency and thus may be efficiently removed using an existing alternative current (AC) coupling or filtering technique. However, an odd-order component is generated adjacent to an existing center frequency and is not easily removed, unlike the even-order component, thereby having great influence upon reception. In consideration of the non-linear characteristics of the odd-order component, the received signal after the ADC in the FDR system is expressed using a parallel Hammerstein (PH) model as shown in Equation 1 below.

$$y(n) = h_D(n) * x_D(n) + \sum_{\substack{k=1,\ldots,K \\ k=odd}} h_{SI,k}(n) * |x_{SI}(n)|^{k-1} x_{SI}(n) + z(n), \quad \text{[Equation 1]}$$

In Equation 1, y(n) denotes a received signal, $h_D(n)$ denotes a channel experienced by desired data, $x_D(n)$ denotes desired data to be received, $h_{SI,k}(n)$ denotes a self-channel experienced by transmitted data, $x_{SI}(n)$ denotes transmitted data, and z(n) denotes additive white gaussian noise (AWGN). $h_{SI,k}(n)$ is a linear component when k is 1 and is a non-linear component when k is an odd number of 3 or more.

In order to cancel the above-described analog or digital self-interference, it is necessary to estimate a self-channel. In this case, a received signal after performing self-interference cancellation using gain of the estimated analog or digital self-channel may be expressed as shown in Equation 2 below.

$$y_{Self-IC}(n) = h_D(n) * x_D(n) + \underbrace{\sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)}_{Residual\ SI}, \quad \text{[Equation 2]}$$

In Equation 2, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Thereafter, a result of decoding the received signal using the gain of the estimated desired channel is shown in Equation 3 below.

$$\frac{\hat{h}_D^*(n) y_{Self-IC}(n)}{|\hat{h}_D^*(n)|^2} = \frac{\hat{h}_D^*(n) * h_D(n)}{|\hat{h}_D^*(n)|^2} x_D(n) + \frac{\hat{h}_D^*(n) * z'(n)}{|\hat{h}_D^*(n)|^2} \quad \text{[Equation 3]}$$

$$= x_D(n) + \frac{\hat{h}_D^*(n) * e(n)}{|\hat{h}_D^*(n)|^2} + \frac{\hat{h}_D^*(n) * z'(n)}{|\hat{h}_D^*(n)|^2}$$

$$z'(n) = \sum_{\substack{k=1,\ldots,K \\ k=odd}} \left(h_{SI,k}(n) - \hat{h}_{SI,k}(n)\right) * |x_{SI}(n)|^{k-1} x_{SI}(n) + z(n)$$

$$e(n) = h_D(n) - \hat{h}_D(n)$$

In Equation 3, $\hat{h}_D(n)$ denotes an estimated desired channel, $y_{Self-IC}(n)$ denotes a received signal after interference cancellation, $h_D(n)$ denotes a channel experienced by desired data, $x_D(n)$ denotes desired data to be received, $h_{SI,k}(n)$ denotes a self-channel experienced by transmitted data, $\hat{h}_{SI,k}(n)$ denotes gain of the estimated analog or digital self-channel, $x_{SI}(n)$ denotes transmitted data, and z(n) denotes AWGN.

Figure 8:
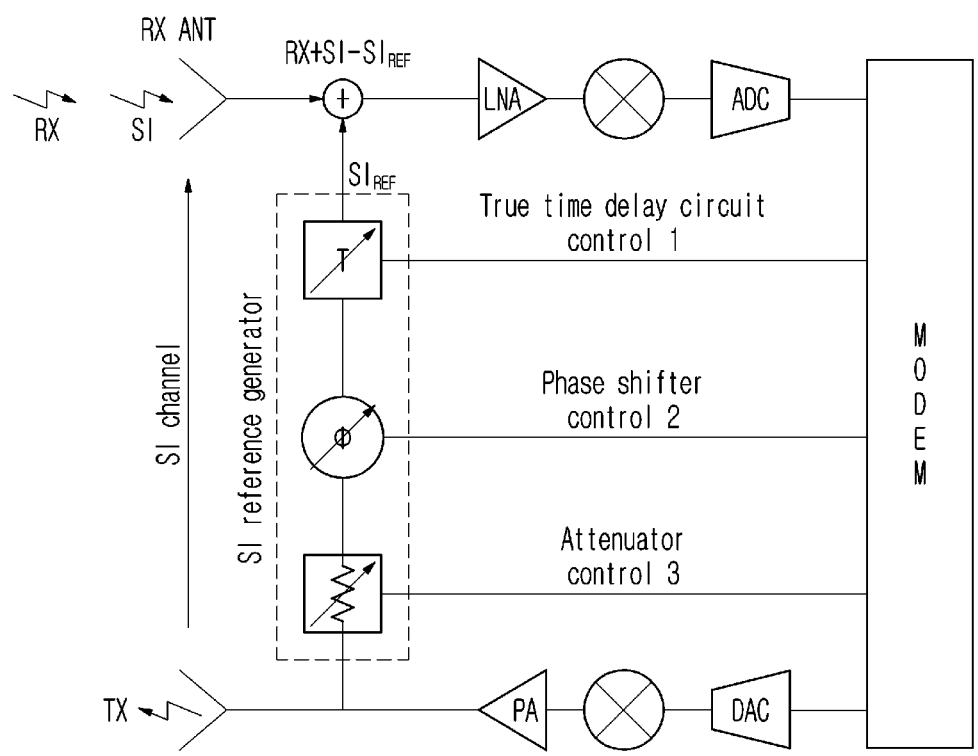
FIG. 8 illustrates an example of an RF chain of a communication device for self-interference signal cancellation according to an embodiment of the present disclosure.

FIG. 8. illustrates an example of an RF chain of a communication device for self-interference signal cancellation according to an embodiment of the present disclosure.

In order to cancel a self-interference signal in a communication device using a FDR method, a duplicated signal equal to the self-interference signal (hereinafter referred to as a "self-interference reference signal") is necessary. Referring to FIG. 8, in order to cancel the self-interference signal, a method of subtracting a self-interference reference signal $SI_{REF}$ from a self-interference signal before the LNA of a receive chain is generally used. In this case, in order to generate the self-interference reference signal $SI_{REF}$ in the communication device, a transmitted signal of a transmission end is branched. In the example of FIG. 8, a TX signal is branched after passing through a PA in the transmission end. A portion of the branched transmitted signal passes through an SI reference generator including an attenuator, a phase shifter and a time delay circuit. A self-interference reference generator mimics a self-interference channel and generates a self-interference reference signal $SI_{REF}$ from the branched transmitted signal. In this case, a channel experienced by the self-interference signal is separately estimated such that the self-interference reference generator mimics the self-interference channel.

First, the communication device may generate a control signal for the time delay circuit, a control signal for the phase shifter and a control signal for the attenuator, after estimating the self-interference channel. In this case, a desired RX signal should not be input to a self-interference reference signal path.

There are two methods for controlling the self-interference reference generator by the communication device. As a first method, the communication device may stop communication and transmit a signal for estimating a self-interference channel (e.g., a pilot signal or a reference signal) in an allocated communication band or channel band in order to separately estimate a channel, into which a self-interference signal is introduced, and the self-interference reference generator may mimic a self-interference signal based on information on the signal for estimating the self-interference channel during communication. As a second method, the communication device may transmit a signal for estimating a self-interference signal channel (e.g., a reference signal, a pilot signal or a tone) at both ends of a communication channel band (e.g., guard bands) and control the self-interference reference generator to reduce the signal for estimating the self-interference signal channel according to an adaptive feedback algorithm.

In the first method, in order to find the optimized state of the self-interference reference generator, it is first necessary to estimate the self-interference channel. To this end, a transmission device and a reception device should stop communication. Moreover, even if complete self-interference channel is performed, very accurate calibration of a self-interference reference path is required. The channel of the self-interference reference path is preferably represented by a look-up table based on a combination of all control voltages. Even if an accurate look-up table is created at a specific transmit power and temperature, this is changed according to the original Tx power and the temperature of the circuit. Therefore, self-interference signal cancellation performance may deteriorate due to calibration measurement errors and a difference between current transmit power and temperature and conditions when the look-up table is created. In addition, the first method cannot follow the self-interference signal channel varying over time.

In the second method, since the communication device transmits the signal for estimating the self-interference signal channel (e.g., a tone, a pilot signal, a reference signal, etc.) at both sides of the communication band, communication may not be stopped. In addition, in the second method, since the self-interference reference generator is controlled using an adaptive feedback algorithm in a time-continuous manner, calibration of the self-interference reference generator is unnecessary. However, since the self-interference reference generator is controlled using guard bands at the both sides of the communication band instead of the communication band, a self-interference signal may not be canceled due to transmission of a tone inside the most important communication band.

Figure 9:
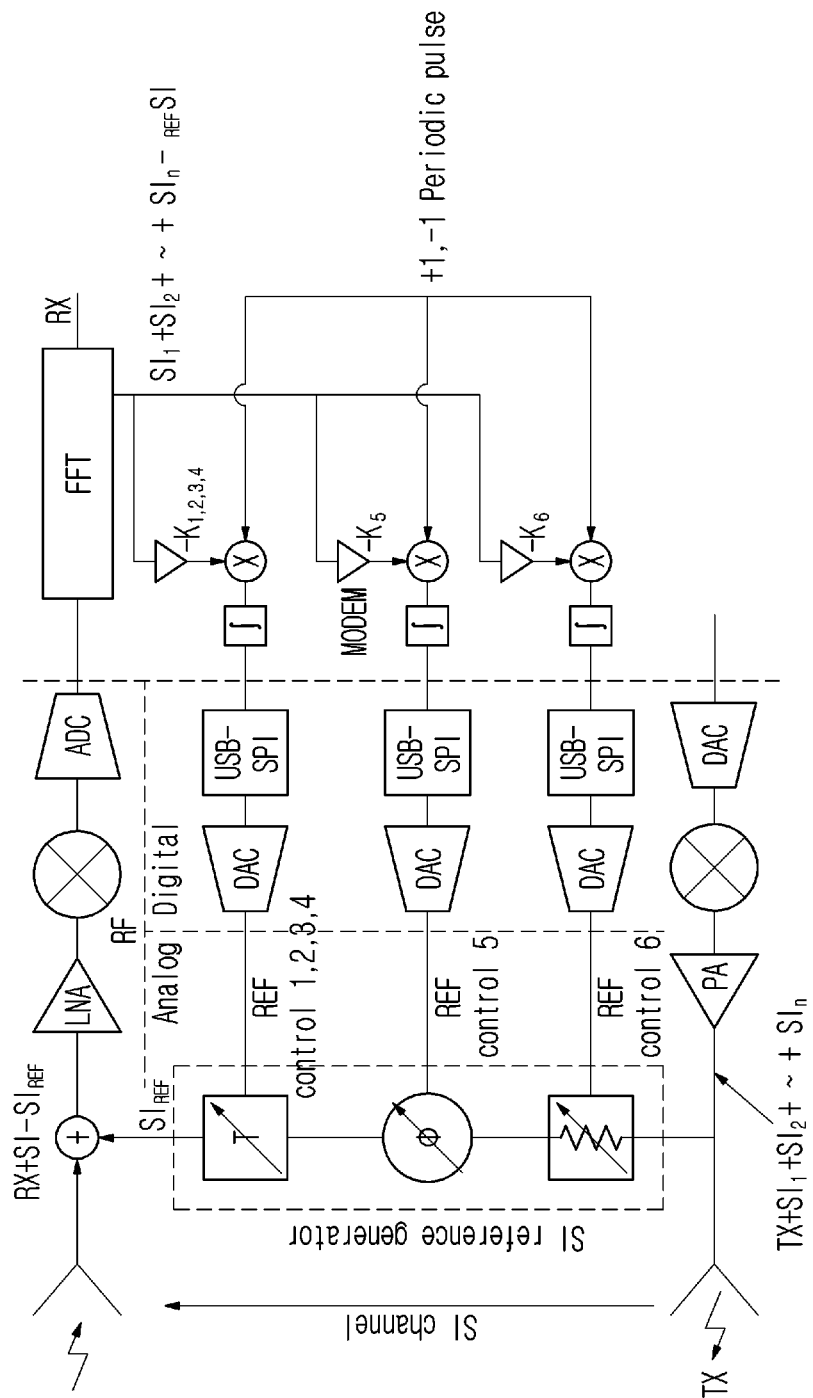
FIG. 9 illustrates another example of an RF chain of a communication device for self-interference signal cancellation according to another embodiment of the present disclosure.

FIG. 9 illustrates another example of an RF chain of a communication device for self-interference signal cancellation according to another embodiment of the present disclosure.

Referring to FIG. 9, the RF chain of the communication device may include a communication modem, a self-interference reference generator, a Tx antenna, an Rx antenna, etc. The communication modem may include a fast Fourier transform (FFT) block and integrators. The self-interference reference generator may include an attenuator, a phase shifter and a time delay circuit.

The self-interference reference generator may control the attenuator, the phase shifter and the time delay circuit in an analog manner in order to generate or duplicate an precise self-interference reference signal. To this end, the RF chain may include at least one DAC for converting a control signal transmitted from a communication mode into an analog signal.

Based on the concept of the time delay circuit basically defined as phase shift versus the slope of a frequency band, it is impossible to control time delay with only information at one a single frequency. Accordingly, in order to perform self-interference signal cancellation in a wide band, information at at least two frequencies is required, such that two or more pilot signals, two or more reference signals or two or more tones may be transmitted as test signals.

In order to control the self-interference reference generator, multi-reference signals, multi-tones or multi-pilot signals may be used as test signals. First, in FIG. 9, the communication modem may monitor a power sum of multi-tones at a frequency at which the multi-tones as the test signals are located and measure power of each multi-tone at a frequency location where the multi-tones are transmitted, thereby calculating a sum of powers. Here, power measured at the frequency location of the transmitted tone corresponds to the power of the self-interference signal.

The communication modem may transmit a control signal such that a difference between a power sum of self-interference signals due to the multi-tones and the power of the self-interference reference signal is minimized. That is, the communication modem may feed the control signal back to the self-interference reference generator such that the sum of the powers of the self-interference signals due to the multi-tones is minimized. The self-interference reference generator generates a self-interference reference signal according to the fed-back control signal. In order to remove the measured power sum of the self-interference signals, the communication modem may generate a self-interference reference signal with power closest to the power sum.

The communication modem may control the self-interference reference generator until the power sum $SI=SI_1+SI_2+SI_3+\ldots+SI_n$ of the self-interference signals is minimized using an adaptive feedback loop. Here, $SI_n$ is power of the self-interference signal measured at a frequency location where an n-th reference signal of a plurality of reference signals is transmitted. The communication modem uses a periodic pulse signal of +1 and −1 such that the sign of the increment of a bias voltage controlled by the loop function of adaptive feedback is changed. Here, the loop function means a function for searching around a current variable in the feedback loop including a variable to be controlled.

The communication modem may feed the control signal back to the phase shifter, the attenuator and the time delay circuit using the adaptive feedback loop, such that the self-interference reference generator generates a self-interference reference signal with power closest to the power sum of the self-interference signals.

The method of controlling generation of the self-interference reference signal described with reference to FIG. 9 has an advantage that complicated channel estimation and calibration are unnecessary because the adaptive feedback algorithm operates with only the power sum of the multi-tones.

Figure 10:
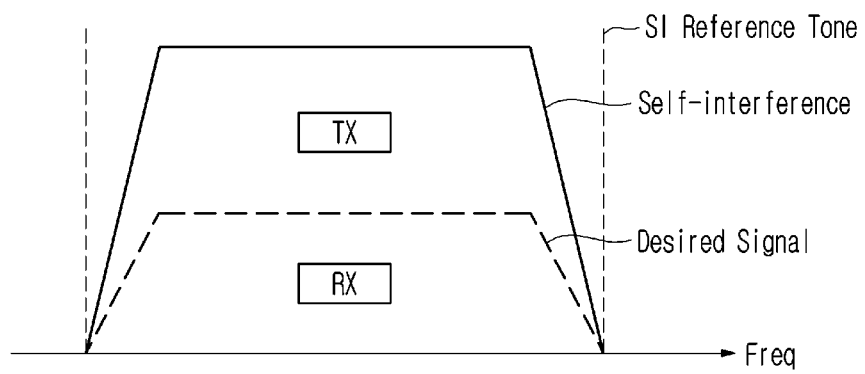
FIG. 10 illustrates examples of two tones used to generate a self-interference reference signal according to an embodiment of the present disclosure.

FIG. 10 illustrates examples of two tones used to generate a self-interference reference signal according to an embodiment of the present disclosure. FIG. 10 shows two tones transmitted at both sides (e.g., guard bands) of the communication band in order to control the self-interference reference generator of FIG. 8 or 9.

Referring to FIG. 10, tones for estimating the self-interference signal channel may be transmitted at the guard bands located at both ends of the communication channel band and the self-interference reference generator may be controlled to reduce tones according to the adaptive feedback algorithm. In this case, a desired signal, from which self-interference is canceled, may be stably received.

Figure 11:
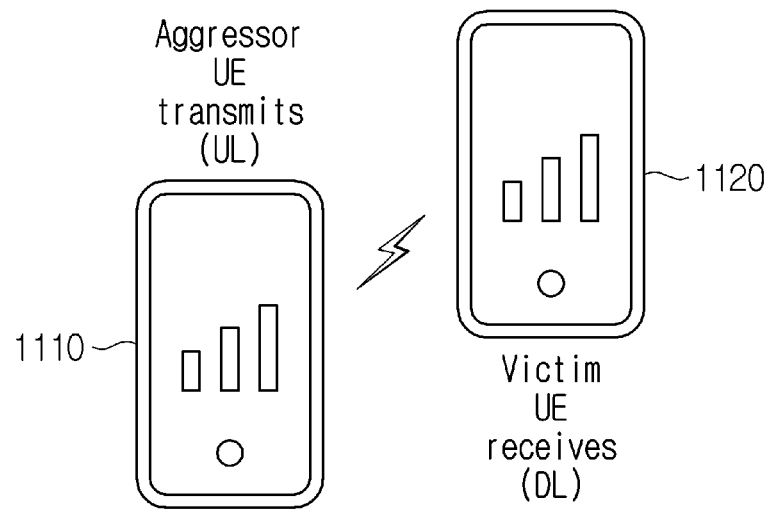
FIG. 11 illustrates an example of CLI between an uplink and a downlink according to an embodiment of the present invention.

FIG. 11 illustrates an example of CLI between an uplink and a downlink according to an embodiment of the present invention.

In addition, as an example, referring to FIG. 11, cross link interference (CLI) may be considered as interference between links. As a concrete example, in a new communication system (e.g., NR), a resource may be allocated based on a dynamic time division duplex (TDD) method by considering efficiency of resource usage. Herein, CLI between an uplink and a downlink may occur. Specifically, referring to FIG. 11, it is possible to consider a terminal (aggressor UE) 1110 performing uplink transmission in a specific cell and a terminal (victim UE) 1120 receiving a downlink in another cell. Herein, an uplink signal of the terminal 1110 performing the uplink transmission may become interference to the terminal 1120 receiving the downlink, and the above-described CLI may occur. As another example, based on the above-described situation, CLI may also occur between base stations or between a base station and a terminal.

Based on the above description, a method may be required for a terminal to measure, report and reduce CLI between terminals. In this case, as an example, in order to measure CLI, the terminal may measure at least any one of CLI received signal strength indicator (CLI-RSSI) and sounding reference signal-received signal received power (SRS-RSRP). The terminal may report at least any one of CLI- RSSI and SRS-RSRP, which are measured based on a RRC message, to a base station periodically or based on event triggering. Based on information thus reported, the base station may operate a resource so as to minimize interference and thus may operate the resource efficiently.

Hereinafter a method for minimizing interference between terminals by considering the above-described CLI operation will be described. As an example, although CLI described above was mainly between a terminal performing uplink transmission and a terminal performing downlink reception based on dynamic TDD but may not be limited thereto. As an example, it is possible to consider a case where a base station performs downlink transmission and uplink reception at the same time based on an FDR mode. In this case, a specific corresponding terminal may perform uplink transmission, another terminal may perform downlink reception, and CLI may occur. That is, CLI may occur based on various transmission types, and hereinafter a method for minimizing interference will be described based on CLI.

Detailed Embodiments of the Present Invention

As the demand for data dramatically increases in recent years, the application of beamforming technique and FDR technique is under discussion in the field of mobile communication. As the use of ultrahigh frequency signal bands is under discussion, studies are underway to expand radio coverage by overcoming the problematic path loss of ultrahigh frequency signals through the beamforming technique or to increase communication capacity by applying the FDR technique.

An FDR communication system is a communication system that receives and transmits data at a same frequency band. The FDR communication system may improve the frequency use efficiency as much as twice that of the existing frequency-division duplex (FDD)/time-division duplex (TDD) scheme in a half-duplex mode. However, as a base station/terminal in the FDR communication system transmits and receives a signal simultaneously at a same frequency band and thus a transmission signal may interfere with a reception unit, a method for minimizing such an interference effect is needed. Interference signals like cross-link interference (CLI), which is generated by transmission and reception signals of a neighboring communication devices, and self-interference (SI), by which a transmission signal of a communication device becomes interference to a reception unit of the communication device, may degrade the receiving performance of receivers.

An FDR environment has an ultimate objective to operate every communication device in a full-duplex mode. However, due to the current technical limitations, it is possible to consider operating the full-duplex mode only in a base station and operating a half-duplex mode in a terminal. Based on uplink (UL)/downlink (DL) terminals not coexisting within a close distance, each receiving terminal is subject to a large interference effect caused by CLI of transmitting terminals. External interference signals corresponding to CLI have an interference effect on receiving terminals at different signal intensities according to elements like a number of antennas used by a device, a transmission signal intensity, a distance between devices, and movement of a terminal. Accordingly, in order to maintain the quality and safety of a link by reducing interference effects on receiving terminals, an additional circuit or algorithm needs to be applied within a reception unit or a separate mechanism is required to reduce interference effects between base stations/terminals.

There is a method of reducing interference also in the radio frequency (RF) domain. When a beamforming technique is applied, a transmission/reception beam pattern may be adjusted and signals may be spatially separated to be transmitted and received so that an effect of interference may be reduced without implementing an additional circuit. However, in case that a beamforming technique for maximizing a beam gain is applied with no consideration of an interference signal, a transmission/reception beam gain is added to an interference signal intensity so that the effect of interference may become greater. In this case, there may be degradation in the receiving performance of a device and the quality and stability of signals transmitted or received. In a situation where the performance of a reception unit depends greatly on an effect of interference, when a beamforming scheme for maximizing a beam gain is used for a (desired) transmission/reception signal as it is, a beam thus formed may not consider an effect of an interference signal so that not only the quality of receiving performance is degraded but also the stability of a link is not ensured. Accordingly, it is necessary to remove interference by means of a beamforming scheme that forms a null on a beam pattern in an interference direction.

As an example method for reducing an interference effect by forming a null on a beam pattern, there is a null-steering beamforming scheme. The null-steering beamforming scheme calculates a beam weight to maximize a beam gain for a transmission/reception signal and also to form a null beam for an interference signal. At this time, an incidence angle of the interference signal should be known so that the null beam may be formed thorough the beam weight in an interference direction. Accordingly, a procedure for estimating an incidence angle of an interference source is further needed. Furthermore, in a mobile communication environment, a beam direction may change due to a change in an angle-of-arrival (AoA)/angle-of-departure (AoD) of a transmission/reception signal which is attributable to a movement of a terminal. Accordingly, an effect of interference may be effectively removed by forming not a sharp null region but a wide null region. That is, a conventional null-steering beamforming scheme, which forms a sharp null region, may not completely remove an interference effect.

Accordingly, a beam management/beam tracking procedure is needed to form a null beam and thus to efficiently reduce an interference effect, and a technique and a mechanism are needed to stably operate a link by considering all effects of a transmission/reception signal and an interference signal.

Therefore, the present disclosure proposes a beam pattern tracking method and device that, when a beamforming technique is applied in an FDR communication system, may reduce an effect of an interference signal in a RF domain without implementing an additional circuit at a receiving end and detect a null region of a beam.

Embodiments below may be implemented in a situation where a base station and a terminal in an FDR environment operate a plurality of arrays. As an example, for convenience of explanation, the description below will be based on a situation where only a base station is operated in a full-duplex mode and terminals are operated in a half-duplex mode. However, this is merely one example and may also be applicable to a situation, in which every communication device is operated in a full-duplex mode, or to other communication situations.

Figure 12:
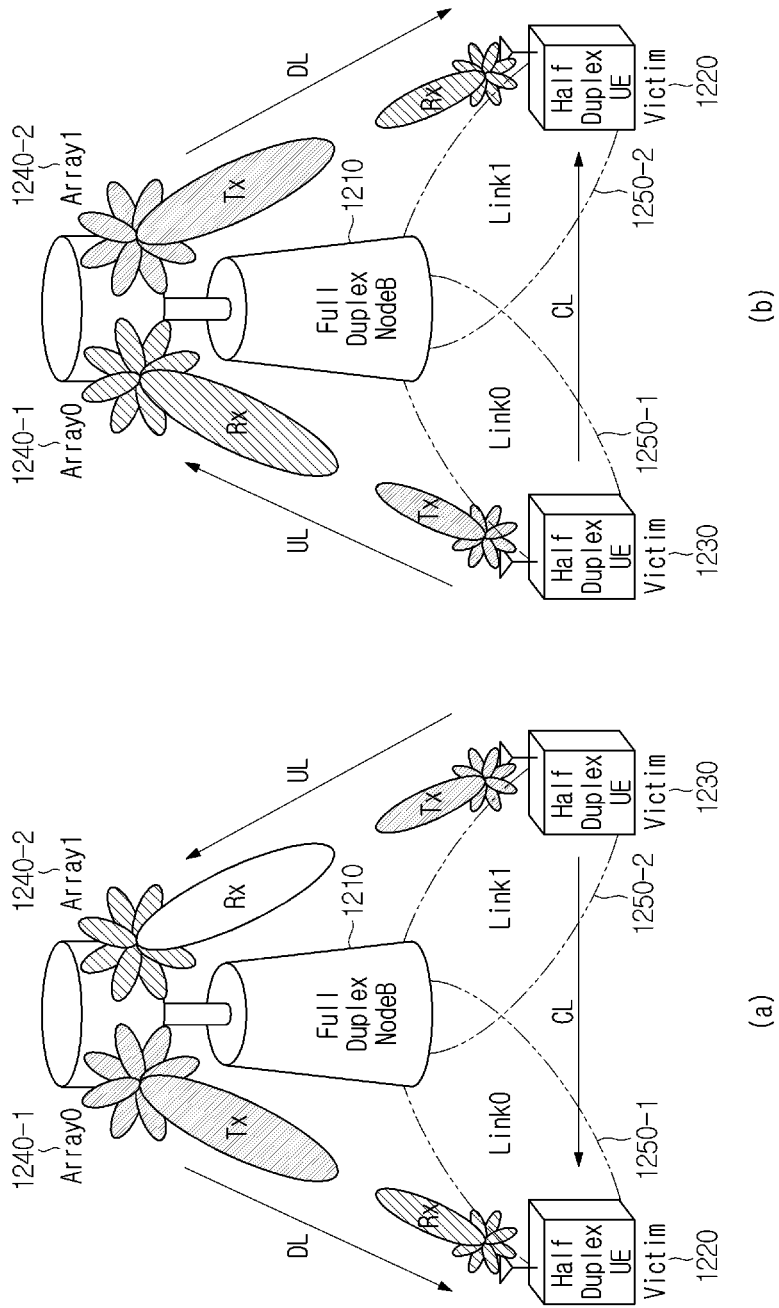
FIG. 12 illustrates an example of a communication system supporting beamforming in an FDR environment according to an embodiment of the present invention.

FIG. 12 illustrates an example of a communication system supporting beamforming in an FDR environment according to an embodiment of the present invention.

Referring to (a) of FIG. 12 and (b) of FIG. 12, a base station 1210 and terminals 1220 and 1230 may communicate with each other in an FDR communication system supporting beamforming. As an example, the base station 1210 may communicate with the terminals 1220 and 1230 by simultaneously using a plurality of arrays 1240-1 and 1240-2 respectively through UL/DL in a full-duplex mode. The terminals 1220 and 1230 may communicate with the base station 1210 by using a resource alternately through UL/DL in a half-duplex mode. As an example, the base station 1210 may communicate with the two terminals 1220 and 1230 within coverage through a link 0 1250-1 and a link 1 1250-2 respectively. As an example, the base station 1210 may use the two antenna arrays 1240-1 and 1240-2 and operate UL/DL independently in each of the arrays 1240-1 and 1240-2. All the antenna arrays 1240-1 and 1240-2 of the base station 1210 and the terminals 1220 and 1230 may be operated not in a switched beam scheme but in an adaptive antenna array scheme. In this case, a beam weight may be adaptively applied to each antenna element by using a digital beamforming scheme. When the base station 1210 and the terminals 1220 and 1230 perform communication, the aggressor terminal 1230 may have an interference effect on the victim terminal 1220. The aggressor terminal 1230 is a terminal having an interference effect on another terminal, while the victim terminal 1220 is a terminal subject to an interference effect of another terminal. As the terminals 1220 and 1230 in a half-duplex mode communicate with a single array alternately trough UL/DL, when the terminal 1220 changes its operation from UL to DL, the terminal 1220 receives a transmission/reception signal of the other terminal 1230 and thus may be subject to interference.

Figure 13A:
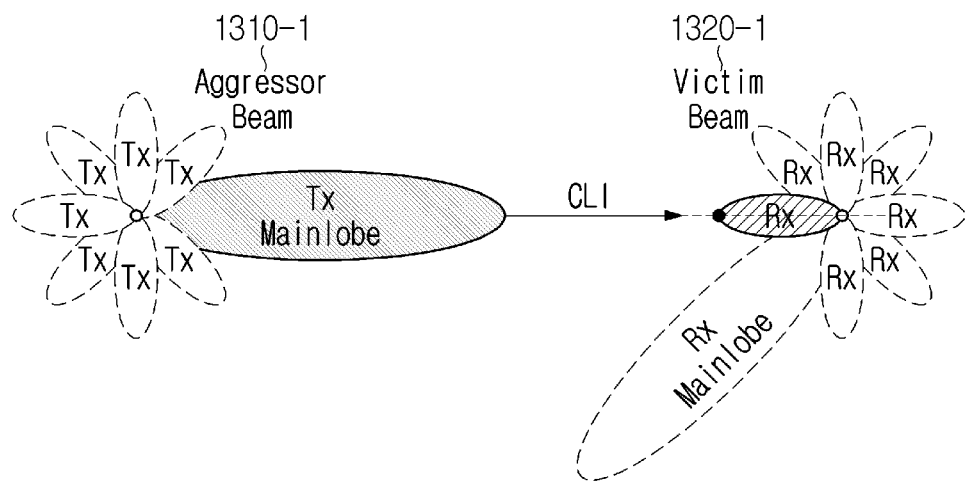
FIG. 13A illustrates an example of a case where a cross-link interference (CLI) effect occurs in an FDR environment according to an embodiment of the present invention.
Figure 13B:
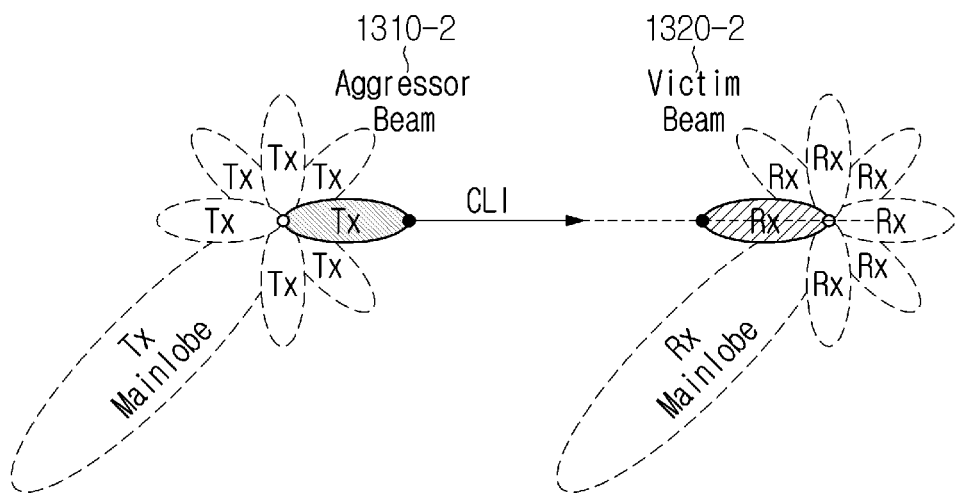
FIG. 13B illustrates an example of a case where a cross-link interference (CLI) effect occurs in an FDR environment according to an embodiment of the present invention.

FIG. 13A and FIG. 13B each illustrates an example of a case where a cross-link interference (CLI) effect occurs in an FDR environment according to an embodiment of the present invention.

Referring to FIG. 13A and FIG. 13B, aggressor beams 1310-1 and 1310-2 have a CLI effect on victim beams 1320-1 and 1320-2. The aggressor beams 1310-1 and 1310-2 may be beams having an interference effect, and the victim beams 1320-1 and 1320-2 may be beams subject to an interference effect. Particularly, in a situation where a lobe of the aggressor beams 1310-1 and 1310-2 having a CLI effect in a transmission/reception array beam pattern is align and overlap with a lobe of a victim beam, the interference effect may be so maximized as to become a bad effect on a link between a base station and a terminal.

An effect of interference may depend on a beam pattern shape of each transmission/reception array. As an example, in case that a beam region, in which a mainlobe of a transmission signal is present, becomes the aggressor beam 1310-1, it may have a great interference effect on the victim beam 1320-1. In case that a beam region other than a region, in which a mainlobe of a transmission signal is present, becomes the aggressor beam 1310-2, it may have a smaller interference effect on the victim beam 1320-1 than the region in which the mainlobe is present.

As described in FIG. 13A and FIG. 13B, since an effect of interference may depend on a beam pattern shape of each transmission/reception array, when a pattern shape of a transmission/reception beam subject to an interference effect is adaptively reduced, an effect of CLI may be reduced and a link between a base station and a terminal may be stably operated.

Figure 14A:
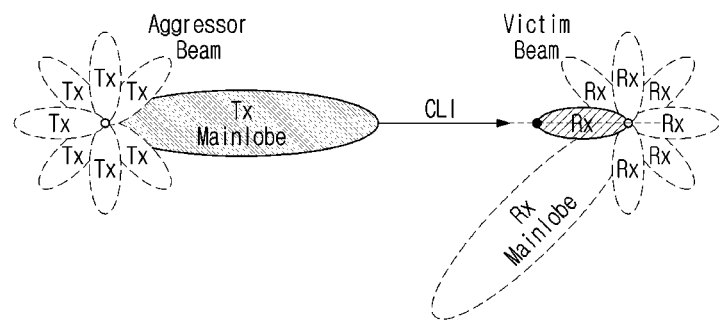
FIG. 14A illustrates an example of adjusting a transmission/reception beam pattern shape on which an interference effect occurs according to an embodiment of the present invention.
Figure 14B:
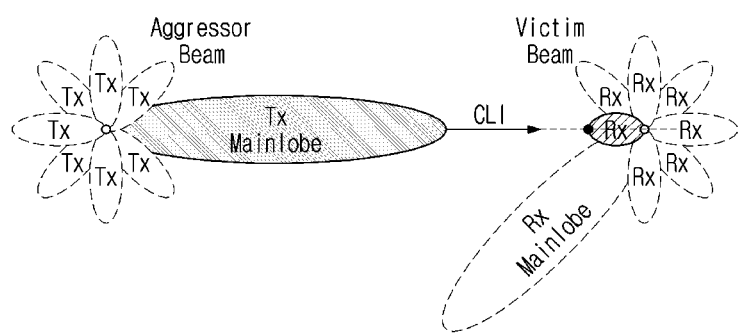
FIG. 14B illustrates an example of adjusting a transmission/reception beam pattern shape on which an interference effect occurs according to an embodiment of the present invention.

FIG. 14A and FIG. 14B each illustrates an example of adjusting a transmission/reception beam pattern shape on which an interference effect occurs according to an embodiment of the present invention.

Referring to FIG. 14A and FIG. 14B, when a pattern of an aggressor beam is adjusted, a transmission beam gain of a region with CLI is reduced so that an interference effect decreases.

Figure 14C:
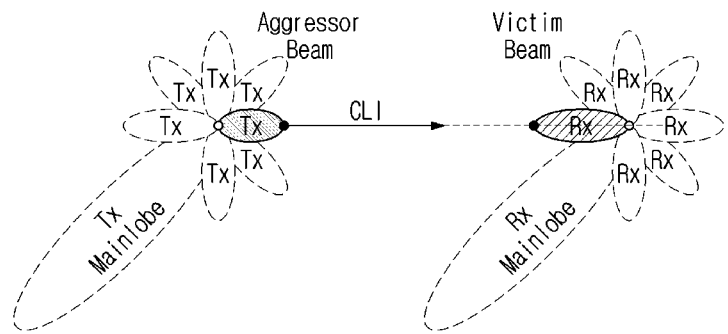
FIG. 14C illustrates an example of adjusting a transmission/reception beam pattern shape on which an interference effect occurs according to an embodiment of the present invention.
Figure 14D:
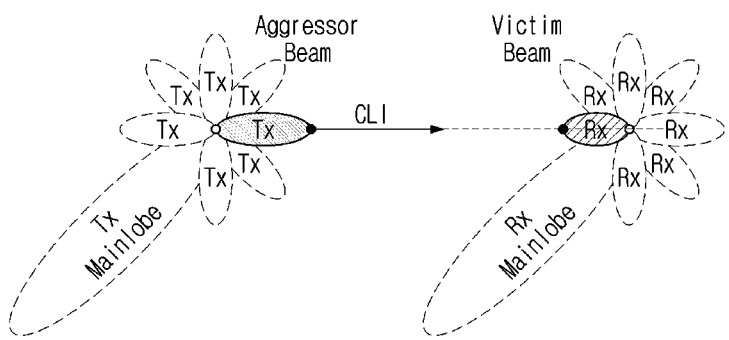
FIG. 14D illustrates an example of adjusting a transmission/reception beam pattern shape on which an interference effect occurs according to an embodiment of the present invention.

Also, FIG. 14C and FIG. 14D each illustrates an example of adjusting a transmission/reception beam pattern shape on which an interference effect occurs according to an embodiment of the present invention.

Referring to FIG. 14C and FIG. 14D, when a pattern of a victim beam is adjusted, a reception beam gain of a region with interference is reduced so that an interference effect decreases. That is, in order to prevent an interference effect from degrading link quality between a base station and a terminal, a terminal needs to adaptively form a beam pattern so that the interference effect may be reduced.

A beam pattern may be formed in various shapes according to a physical structure of an array and a beam adjustment weight. When a physical structure of an array is determined during a manufacturing process of an antenna, a feature of an array beam of a device may be fixed unless the device is capable of moving the antenna. Accordingly, after a physical array structure of a device is determined, the feature and shape of a beam may be changed by adjusting a beam adjustment weight.

As an example, an array factor (AF) of a uniform linear array (ULA) antenna structure may be expressed by Equation 4 below. Herein, k is a propagation constant, $\bar{r}$ is a unit vector in r direction in a spherical coordinate system, $\hat{r}_n$ is a position vector of a n-th radiating element, $\beta_n$ is a phase transition value for beam steering, $x_n$ is an excitation signal weight for a pattern null forming beam, $\mathbb{A}$ is a matrix that defines beam steering according to an observation angle $(\theta_m)$, and $\mathbb{X}$ is a weight matrix for forming a pattern null.

$$AF = \sum_{n=0}^{N-1} |\mathcal{X}_n| e^{jk\bar{r}\cdot\hat{r}_n} e^{j\beta_n} e^{j\angle x_n} = \qquad \text{[Equation 4]}$$

$$\sum_{n=1}^{N} e^{jkd(n-1)\sin\theta_m} (e^{j\beta_n}) (|x_n| e^{j\angle x_n}) = \mathbb{A}\mathbb{X}$$

Equation 4 above is an array factor equation that multiplies the weight $x_n$ to form a specific null region when a beam is steered in $\beta_n$ direction in a ULA structure with N antenna elements. As an example, in order to calculate the weight $x_n$ for forming a specific null region of a beam, a least-square method may be used to minimize an error between a desired radiating feature and an AF calculated by the weight $x_n$. When using the LS method, since an error reduction effect of a mainlobe or a sidelobe near the mainlobe is larger than a null region, it is difficult to calculate a null forming weight. Accordingly, a weighted LSM (WLSM) may be used to increase an effect of a null region, and the WLSM may be defined for the desired radiating feature $\mathbb{F}$, as expressed in Equation 5 below.

$$\arg\min_{\mathbb{X}} \left\| \mathbb{W}^{\frac{1}{2}} (\mathbb{F} - \mathbb{A}\mathbb{X}) \right\|^2 \qquad \text{[Equation 5]}$$

$$\mathbb{W}(w_{mm}) = \begin{cases} |r_w|, & \theta_{null}^s \leq \theta_m \leq \theta_{null}^e \\ |1|, & \text{other } \theta_m \end{cases}$$

Here, $W$ is an effect weight matrix and is a value set to have an effect increase coefficient $|r_w|$ only for an element corresponding to a specific null region in a unit matrix. The weight $X$ for calculating an AF having a minimum error with a desired radiating feature may be calculated using Equation 6 below.

$$X = (A^H W A)^{-1} A^H W F \quad \text{[Equation 6]}$$

$$F(f_m) = Ac$$

$$c(c_n) = \begin{cases} |r_a|, & \theta_{null}^s \le \theta_m \le \theta_{null}^e \\ |1|, & \text{other } \theta_m \end{cases}$$

Here, $c$ is a damping matrix where an effect damping ratio coefficient has a value of $|r_a|$ for a specific null region.

Consequently, when a beam steered in the direction $\beta_n$ is multiplied by the weight X, a size of a specific region of a beam may be reduced.

Figure 15A:
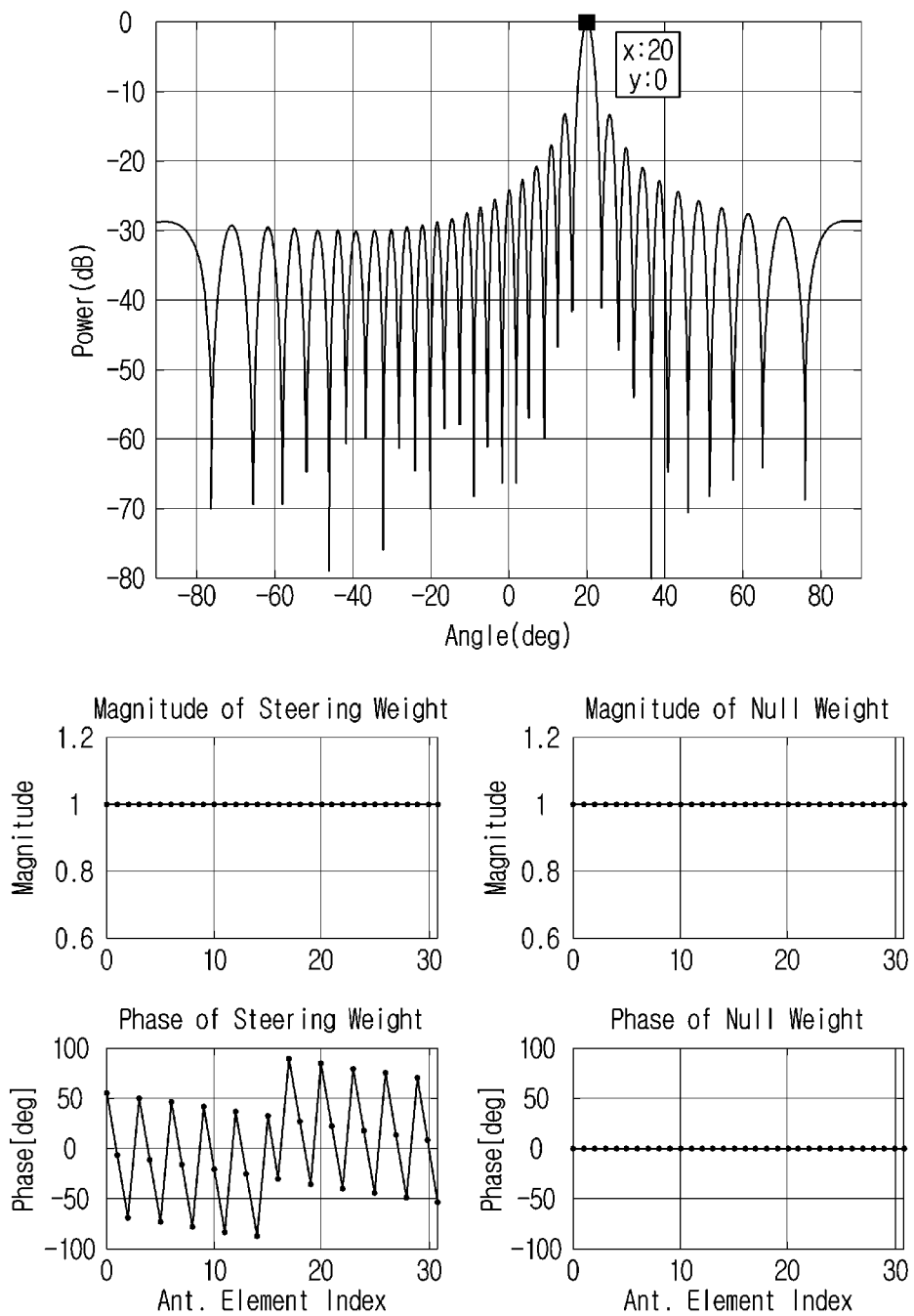
FIG. 15A illustrates example beam patterns of 32 antennas with a uniform linear array (ULA) structure according to an embodiment of the present invention.

FIG. 15A illustrates example beam patterns of 32 antennas with a uniform linear array (ULA) structure according to an embodiment of the present invention.

Referring to FIG. 15A, a graph of beam gain of 32 antennas with ULA structure may be obtained at an azimuth angle ranging from −90 degrees to 90 degrees by placing the antennas at an equal interval of λ/2 on a line.

FIG. 15A illustrates a beam pattern when a beam is steered to form a maximum value (normalized to 0 dB) of beam gain in the 20 degrees direction, and this is a basic beam pattern before a specific null region is formed.

Figure 15B:
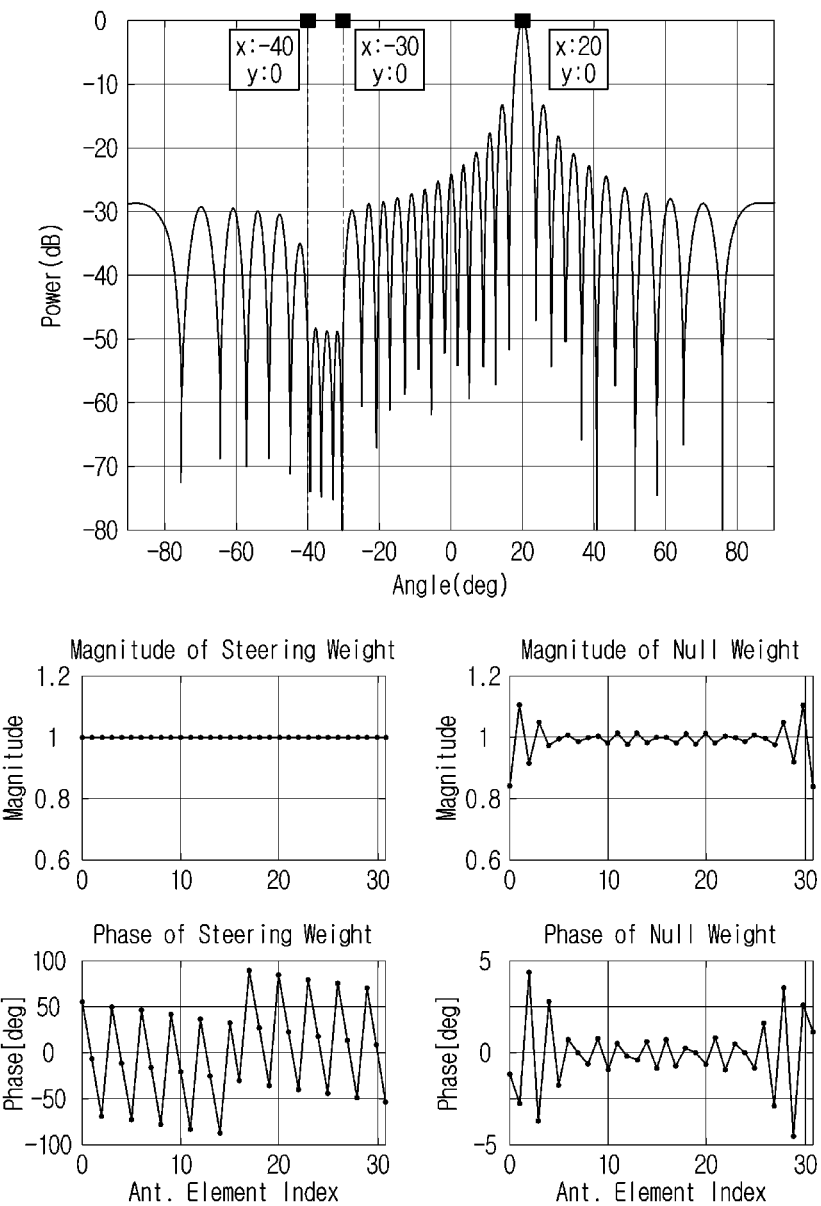
FIG. 15B illustrates example beam patterns of 32 antennas with a uniform linear array (ULA) structure according to an embodiment of the present invention.
Figure 15C:
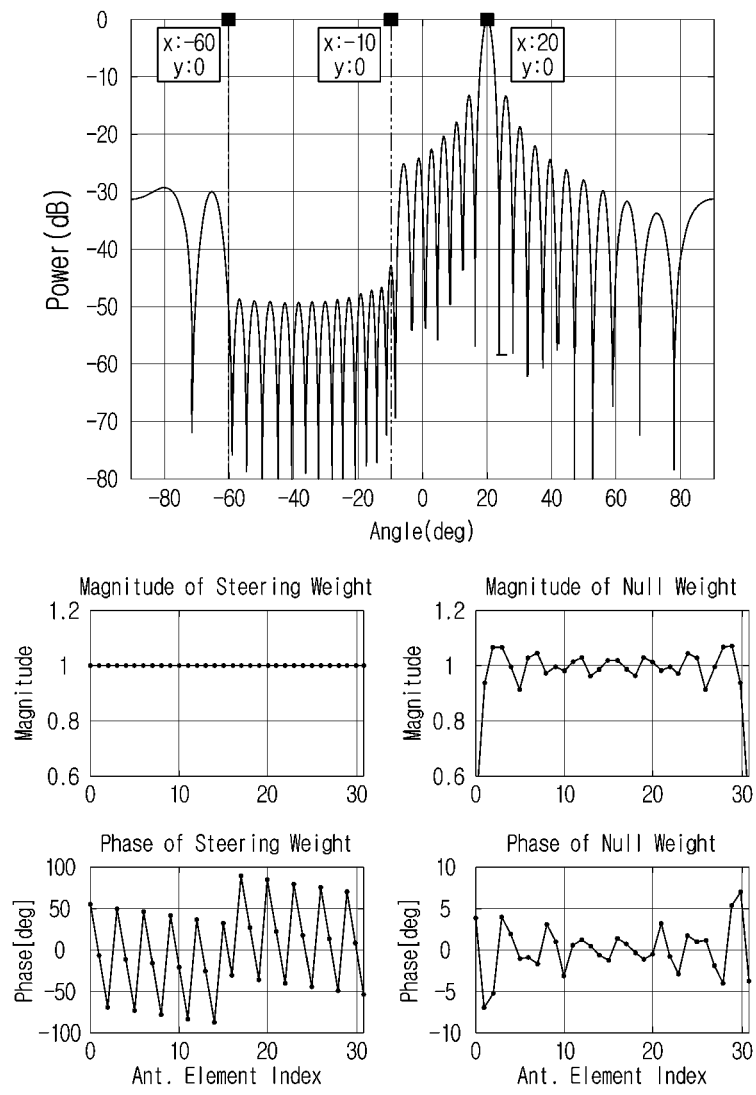
FIG. 15C illustrates example beam patterns of 32 antennas with a uniform linear array (ULA) structure according to an embodiment of the present invention.

Also, FIG. 15B and FIG. 15C each illustrates example beam patterns of 32 antennas with a uniform linear array (ULA) structure according to an embodiment of the present invention.

Referring to FIG. 15B and FIG. 15C, a beam pattern shape may be identified which not only maximizes beam gain for a (desired) transmission/reception signal but also forms a null in a desired region.

FIG. 15B illustrates a beam pattern obtained by deriving and applying a weight to the beam pattern of FIG. 15A so that beam gain is maximized in the 20 degrees direction and also a null region is formed in a range from −40 degrees to −30 degrees. The beam pattern of FIG. 15B shows that the beam gain in the null region is formed at about −50 dB intensity. As an example, a beam gain degree of a null region may be set by adjusting the effect weight matrix w and the effect damping matrix c. As for beam weights, different amplitude values and phase values are applied to each antenna element.

FIG. 15C illustrates a beam pattern obtained by deriving and applying a weight to the beam pattern of FIG. 15A so that beam gain is maximized in the 20 degrees direction and also a null region is formed to be larger than that of FIG. 15B in a range from −60 degrees to −10 degrees. Like in FIG. 15B, the beam gain in the null region is formed at about −50 dB intensity. As for beam weights, different amplitude values and phase values are applied to each antenna element.

That is, as described in FIG. 15A, FIG. 15B and FIG. 15C, when deriving a beam weight capable of forming a null in a desired region, a terminal may form a beam pattern reducing an interference effect by adaptively operating the beam weight according to a direction of interference. Herein, as an example, the beam weight capable of forming a null in a desired region may be a weight that maintains a mainlobe, while forming the null in the desired region. That is, a beam weight may be used which is capable of forming a null in a desired region while maintaining the gain and angle of a mainlobe for communicating with a base station in a beam pattern. Apart from the weighted least squares method (WLSM) illustrated above, calculation methods using heuristic algorithms like particle swarm optimization (PSO) algorithms, genetic algorithms (GAs), and bat algorithms (BAs) may be used to derive a beam weight for forming a null in a beam pattern. The present disclosure proposes a method for forming a beam pattern by using a weight for forming a null region under the assumption that the weight is obtained through such calculation methods.

Figure 16:
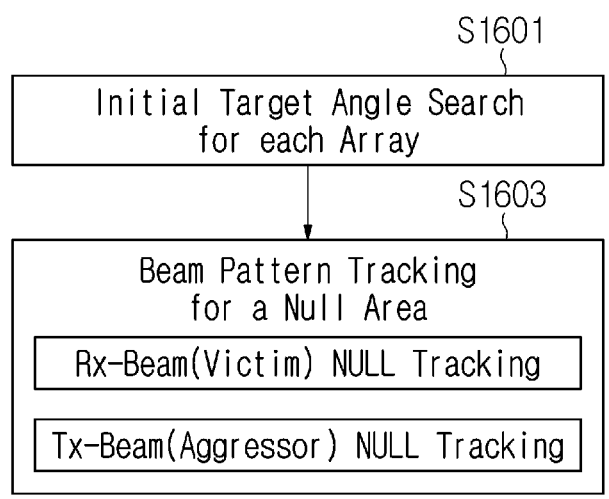
FIG. 16 illustrates an example procedure of reducing an effect of an interference signal through RX/Tx beam null tracking according to an embodiment of the present invention.

FIG. 16 illustrates an example procedure of reducing an effect of an interference signal through RX/Tx beam null tracking according to an embodiment of the present invention.

Referring to FIG. 16, at step S1601, a device may search for initial information for a transmission/reception signal. As an example, the device may search for incidence angle information of an interference signal in order to form a null in a beam in an interference direction. As an example, a victim terminal may measure CLI caused by an interference signal transmitted from an aggressor terminal. The device may search for a target angle for each array. The initial information searched by the device may be used to calculate a weight for forming a null in an interference direction.

At step S1603, the device may perform Rx/Tx beam null tracking for forming a null region based on initial information for a transmission/reception signal. Beam null tracking may be a procedure of searching for a null region to reduce an interference effect by forming a null in a beam. The device may search for a null region, perform measurement for each null region and obtain measurement information. The device may perform beam null tracking for each transmission/reception beam pattern in order to form a null in a transmission/reception beam.

An embodiment according to the present disclosure may be applied from a beam null tracking perspective, after initial beam information is searched for a transmission/reception signal. As the base station is capable of determining a case where Rx/Tx beam null tracking is necessary, beam null tracking may be aperiodically performed by signaling of the base station.

Figure 17:
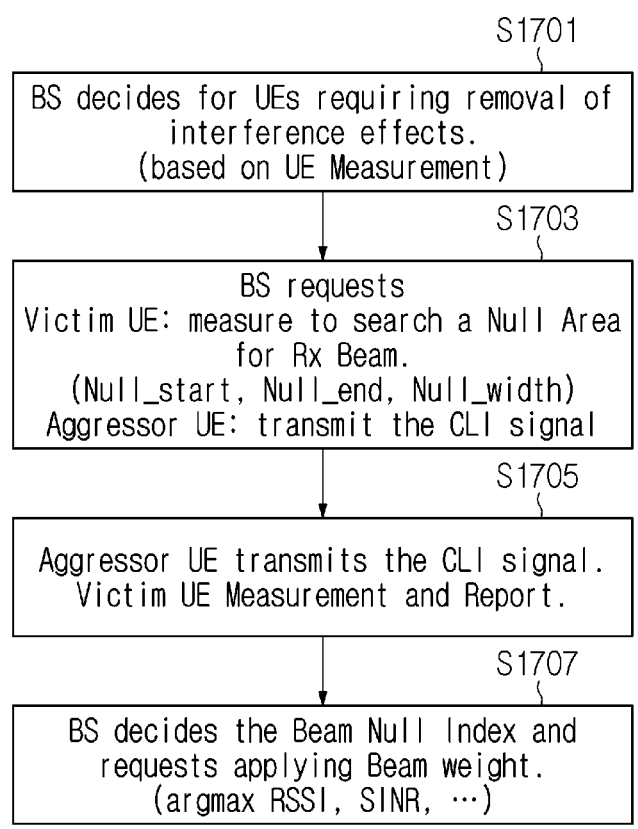
FIG. 17 illustrates an example procedure of reducing an interference effect through Rx beam null tracking according to an embodiment of the present invention.

FIG. 17 illustrates an example procedure of reducing an interference effect through Rx beam null tracking according to an embodiment of the present invention.

Referring to FIG. 17, at step S1701, based on information that a terminal measures for a reception signal, a base station may determine whether or not the terminal is subject to an interference effect caused by CLI. As an example, the base station may receive measurement information for the reception signal of the terminal through UL. The measurement information for the reception signal of the terminal may include at least one of an SNR value for the reception signal measured by the terminal and an SINR measurement value considering CLI. As an example, in case there is no CLI effect on the terminal, SNR and SINR measurement values may be similarly measured by not considering effects of noise and channel. Even when there is a CLI effect on the terminal, an SINR measurement value may be low according to a degree of interference. In this case, a difference value between SNR and SINR may be a criterion for determining a threshold value which the base station uses as a reference for requesting a null region search procedure. Herein, the threshold value may be adjusted according to a channel situation at the base station.

At step S1703, based on determination that a terminal is subject to an interference effect caused by CLI, the base station may request, to the terminal subject to the interference effect (hereinafter 'victim terminal'), a null region search procedure in a reception beam and may request a terminal having the interference effect (hereinafter 'aggressor terminal') to transmit a CLI signal. As an example, the base station may transmit signaling information to the victim terminal so that the victim terminal may implement the null region search procedure in the reception beam. The null region search procedure is a procedure of performing measurement for a region, in which a null region is to be formed, in a reception beam pattern based on information on an interference signal. As an example, when receiving a request to implement the null region search procedure from the base station, the victim terminal may calculate weights for forming a null for each region by dividing an azimuth angle from Null_start to Null_end, which are a start point and an end point of null search respectively in a serving beam pattern for a reception signal, into regions each of which has a size of Null_width. Null_width may have a value set by the base station.

At step S1705, the victim terminal, which receives the request from the base station as described at step S1703, may implement the null region search procedure, create measurement information for each null region and transmit the measurement information to the base station, and the aggressor terminal may transmit a CLI signal. Based on the CLI signal transmitted from the aggressor terminal, the victim terminal may create measurement information for null regions. The measurement information for the null regions may include at least one of an index indicating a null region (a null region index), a width of a null region (a null width), and an SINR value and a RSSI value for each null region. Table 1 below illustrates measurement information for null regions.

TABLE 1

| Null Region Index | Null Width [deg] | SINR | RSSI | ... |
|---|---|---|---|---|
| 0 | X | Y0 | Z0 | ... |
| 1 | X | Y1 | Z1 | ... |
| 2 | Remainder | Y2 | Z2 | ... |

In Table 1, Null Width of Null Region Index 2 may mean a remaining region excluding Null Region Index 0 and 1. The base station and a terminal may exchange measurement information for each null region by using a standardized table index, and the terminal may set measurement information for a null region to SINR and RSSI values and transmit the measurement information to the base station. Table 2 and Table 3 below illustrate standardized table indexes for measurement information for a null region.

TABLE 2

| Power Index | Range of the Measured value [dB] |
|---|---|
| ... | ... |
| SINR_−1 | −1 ≤ RSRP < 0 |
| SINR_0 | 0 ≤ RSRP < 1 |
| SINR_1 | 1 ≤ RSRP < 2 |
| ... | ... |
| SINR_30 | 30 ≤ RSRP < 31 |
| SINR_31 | 31 ≤ RSRP < 32 |
| ... | ... |

TABLE 3

| Power Index | Range of the Measured value [dBm] |
|---|---|
| ... | ... |
| RSSI_−1 | −1 ≤ RSSI < 0 |
| RSSI_0 | 0 ≤ RSSI < 1 |
| RSSI_1 | 1 ≤ RSSI < 2 |
| ... | ... |
| RSSI_30 | 30 ≤ RSSI < 31 |
| RSSI_31 | 31 ≤ RSSI < 32 |
| ... | ... |

At step S1707, the base station may determine a null region of a beam for forming a null and request a terminal to form the null. That is, the base station may determine a region of a reception beam pattern, in which the null of the terminal is to be formed based on measurement information for the null region received from the terminal. As an example, the base station may determine a region, which has a maximized RSSI or SINR value in a beam pattern of a signal received by the terminal, as a region in which the null is to be formed. The base station may determine the region, in which the null is to be formed, based on measurement information of each beam pattern region of a reception signal of the terminal apart from a RSSI value and an SINR value.

Next, the base station may transmit information on a null region, in which the null is to be formed, to the victim terminal. As an example, the base station may transmit, to the terminal, at least one of an index indicating the null region, in which the null is to be formed, and information on a start point and an end point of the null region. In addition, the base station may not only transmit the index indicating the null region to the victim terminal but also request the victim terminal to apply a beam weight.

Based on the information on the null region where the null is to be formed, which the victim terminal receives from the base station, the victim terminal may form a beam pattern to which the null is applied. As an example, based on the information on the null region that the victim terminal receives from the base station, the victim terminal may form a beam pattern by applying a weight to a reception beam.

Figure 18:
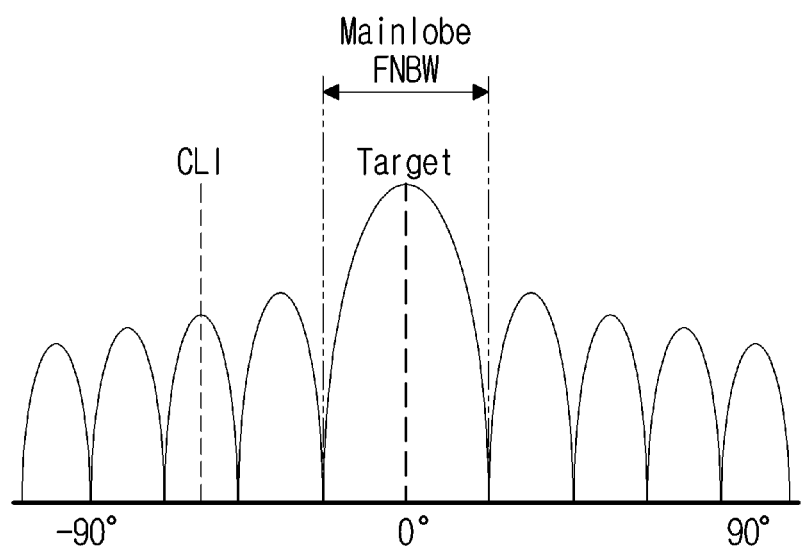
FIG. 18 illustrates an example of a serving beam pattern for a received signal in a victim terminal according to an embodiment of the present invention.

FIG. 18 illustrates an example of a serving beam pattern for a received signal in a victim terminal according to an embodiment of the present invention.

Referring to FIG. 18, it is possible to identify a beam pattern for a signal to be received at an azimuth angle from −90 degrees to +90 degrees. In a serving beam pattern of a terminal, a full null beam width (FNBW) of a mainlobe is set to a random size, and CLI has an interference effect between −30 degrees and −60 degrees.

In order to reduce the effect of CLI, a null region needs to be formed in the section from −30 degrees to −60 degrees in the serving beam pattern. Hereinafter a procedure of searching for a null region for forming a null and thus for reducing an interference effect will be described.

Figure 19:
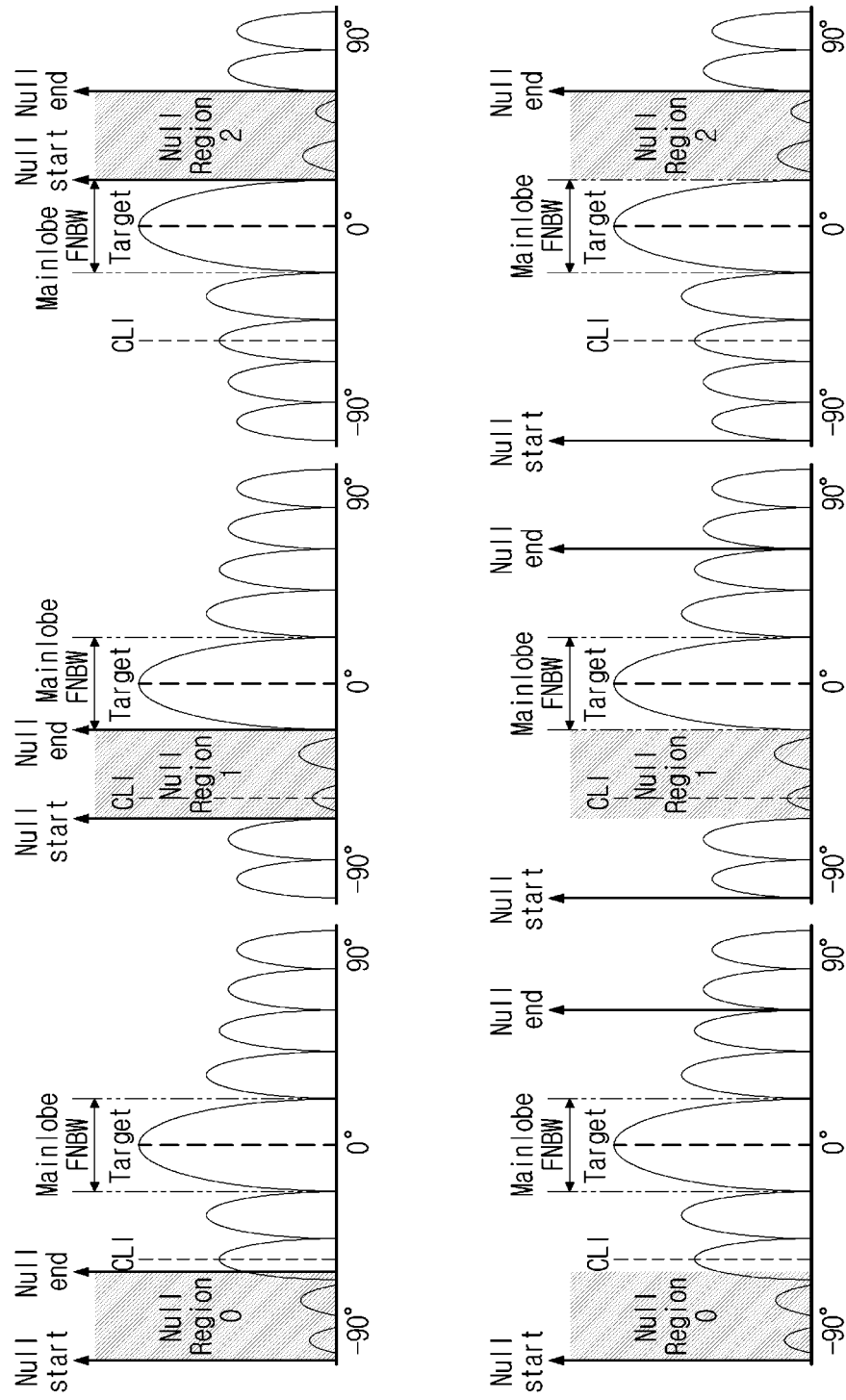
FIG. 19 illustrates an example of searching for a null region in a reception beam according to an embodiment of the present invention.

FIG. 19 illustrates an example of searching for a null region in a reception beam according to an embodiment of the present invention.

Referring to FIG. 19, a terminal may search for each null region of a reception beam. As an example, the terminal may search for a null region based on a request of null region search from a base station. Null region search may be a procedure of measuring a region, in which a null is to be formed, in order to reduce an effect of an interference signal in a reception beam. As an example, the terminal may perform measurement for each section (hereinafter referred to as 'null region') obtained by dividing every azimuth angle of a reception beam pattern according to a certain criterion. The terminal may perform measurement for null regions by considering CLI caused by a signal that another terminal transmits. In this case, the terminal may search for a null region in a region excluding a serving beam mainlobe. As an example, the terminal may measure the start point, end point, size and CLI effect degree of each region with a CLI effect, excluding the serving beam mainlobe. The terminal may measure a Null_start value, which is a start point, and a Null_end value, which is an end point, for each of the null regions obtained by dividing every Null_width set by the base station in the reception beam pattern. As an example, the terminal may measure an SNR value and an SINR value for each null region. Based on information measured for each region, the terminal may create null region measurement information.

The base station may request the null region measurement information to the terminal. As an example, the base station may divide a null region by Null_width, which is set at random, and request Null_start and Null_end of each region to a terminal. As an example, when the base station requests null region measurement information, the terminal may divide a region of a reception beam by using a random value of Null_width received from the base station and may measure information on Null_start and Null_end for each region. An operation of the terminal for performing measurement for a null region at the request of the base station for null region measurement information may not be limited to a specific method. Herein, the random value of Null_width is a set value that may be determined by considering beam information of an aggressor terminal and location information between the aggressor terminal and a victim terminal, and it may be an adjusted value that the base station may determine.

When receiving the null region measurement information from a terminal, the base station may determine a region, in which a null is to be formed, based on the received null region measurement information. At this time, the base station may determine an azimuth region excluding a serving beam mainlobe region as the region in which a null is to be formed. A width of the serving beam mainlobe region may be set by the base station. As the width of the serving beam mainlobe should be determined according to a feature of a Rx antenna array of the terminal, the base station may determine the width of the serving beam mainlobe based on information on a beam that the terminal transmits to the base station during an initial beam search procedure before beam tracking. That is, the base station may set an FNBW of the serving beam mainlobe based on information that the base station receives from the terminal during the initial beam search procedure.

A procedure of searching for a null region of a beam may be implemented by the base station and the terminal through an existing RS without designing a separate RS. The procedure of searching for a null region of a beam is not a procedure of deriving a beam region, in which an optimal null is to be formed, by using an algorithm operation for a dedicated RS signal but a procedure of measuring channel quality of a RS signal for a case in which a null is formed in a specific region of the beam, no separate dedicated RS is required. When the present invention is applied to a RS like a CSI-RS for measuring channel quality, since there may already be measurements SNR, SINR and RSSI for a link, a null region may be efficiently formed without using an additional resource. For a more concrete example, based on a RS for searching for a null region, a victim terminal may measure at least one of CLI-RSSI and SRS-RSRP used for measuring CLI. That is, based on an existing RS, the victim terminal may perform a search for a beam transmitted based on a null region based on a measured value used for CLI measurement in FIG. 11.

In addition, as an example, a victim terminal may measure null tracking information for a reception beam and null tracking information for a transmission beam and report these pieces of null tracking information to a base station. Herein, as an example, when the victim terminal reports the above-described measured values to the base station, the victim terminal may report the above-described measured values to a physical uplink control channel (PUCCH). That is, a measured value may be a type of control information, and a victim terminal may report the measured value to a base station based on a PUCCH report. As another example, a victim terminal may report a measured value to a base station through a physical uplink shared channel (PUSCH). As an example, the victim terminal may report information on a measured value in a form of feedback to the base station through the PUSCH, and thus the base station may recognize the tracking information. In addition, the measured value may be reported to the base station at a preset interval or based on event triggering. As an example, the victim terminal may measure tracking information for a reception beam and tracking information for a transmission beam at a predetermined interval and report these pieces of tracking information to the base station at a preset interval. As yet another example, measure tracking information for a reception beam and tracking information for a transmission beam based on event triggering and aperiodically report a measured value to the base station, but this may not be limited to a specific form.

As an FNBW of a serving beam mainlobe is excluded from a search region in a process of searching for a null region of a reception beam, based on CLI being present in a mainlobe region, even though the null region is formed based on null region measurement information, an interference effect may not be reduced. That is, it may be difficult to reduce an effect of CLI only by changing a beam pattern of a receiving terminal. In this case, the effect of interference may be reduced by searching for a null region of a reception beam of an aggressor terminal, that is, a transmitting terminal.

Compared with the null region search process for a reception beam, the null region search process for a transmission beam has a difference in forming a null for a transmission beam of an aggressor terminal, not for a reception beam of a victim terminal. Accordingly, the base station may transmit Null_start, Null_end and Null_width information for a region, in which a null is to be formed, not to a victim terminal but to an aggressor terminal through DL and request to form a transmission beam to which the null region is applied.

Figure 20:
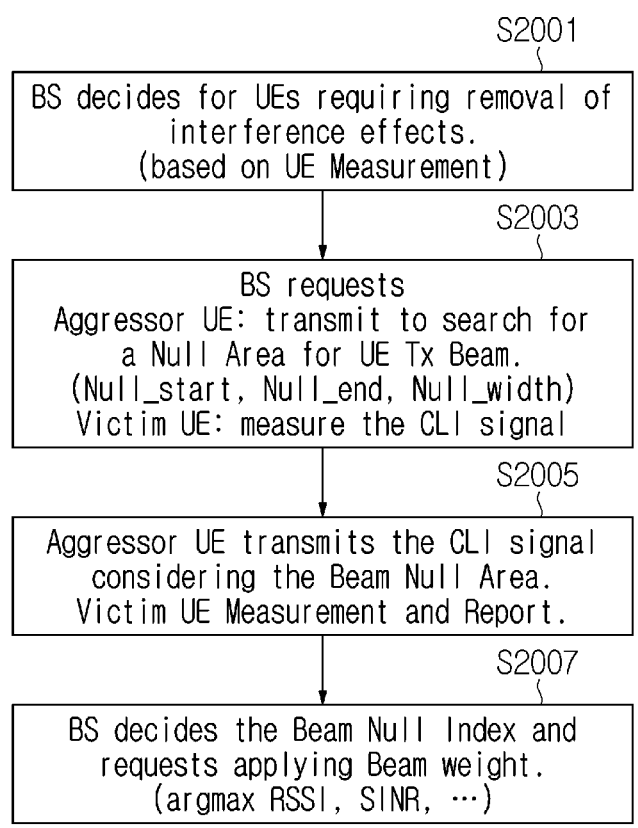
FIG. 20 illustrates an example procedure of reducing an interference effect through Tx beam null tracking according to an embodiment of the present invention.

FIG. 20 illustrates an example procedure of reducing an interference effect through Tx beam null tracking according to an embodiment of the present invention.

Referring to FIG. 20, at step S2001, based on measurement information of a terminal, a base station may determine whether or not the terminal is subject to an interference effect caused by CLI. The measurement information for a reception signal of the terminal may include at least one of an SNR value for a transmission/reception signal measured by the terminal and an SINR measurement value considering CLI.

At step S2003, when the base station determines that the terminal is subject to the interference effect caused by CLI, the base station may request an aggressor terminal to transmit a CLI signal so that a victim terminal may implement a null region search procedure for a transmission beam, and the base station may request the victim terminal to implement the null region search procedure for the CLI signal transmitted from the aggressor terminal. As an example, when receiving a request to implement the null region search procedure from the base station, the victim terminal may calculate weights for forming a null for each region by dividing an azimuth angle from Null_start to Null_end, which are a start point and an end point of null search respectively in a serving beam pattern for a signal transmitted by the aggressor terminal, into regions each of which has a size of Null_width. Null_width may have a value set by the base station.

At step S2005, when receiving the request of the step S2003 from the base station, the aggressor terminal may transmit a CLI signal considering a beam null region, and the victim terminal may create measurement information for each null region after implementing the null region search procedure for a transmission beam of the aggressor terminal. The measurement information for the null regions may include at least one of an index indicating a null region, a size of a null region, and an SINR value and a RSSI value for each null region. The measurement information for the null regions may be illustrated as in Table 1 above.

At step S2007, the base station may determine a null region of a beam for forming a null and request the aggressor terminal to form the null. That is, the base station may determine a region of a transmission beam pattern, in which the null is to be formed based on measurement information for the null region received from the terminal. As an example, the base station may determine a region, which has a maximized RSSI or SINR value in a beam pattern of a signal transmitted by the aggressor terminal, as a region in which the null is to be formed. The base station may determine the region, in which the null is to be formed, based on measurement information of each beam pattern region of a transmission signal of the aggressor terminal apart from a RSSI value and an SINR value.

Next, the base station may transmit information on a null region, in which the null is to be formed, to the aggressor terminal. As an example, the base station may transmit, to the terminal, at least one of an index indicating the null region, in which the null is to be formed, and information on a start point and an end point of the null region. In addition, the base station may not only transmit the index indicating the null region to the terminal but also request the terminal to apply a beam weight.

Based on the information on the null region where the null is to be formed, which the aggressor terminal receives from the base station, the aggressor terminal may form a beam pattern to which the null is applied. As an example, based on the information on the null region that the aggressor terminal receives from the base station, the aggressor terminal may form a beam pattern by applying a weight to a reception beam.

Figure 21:
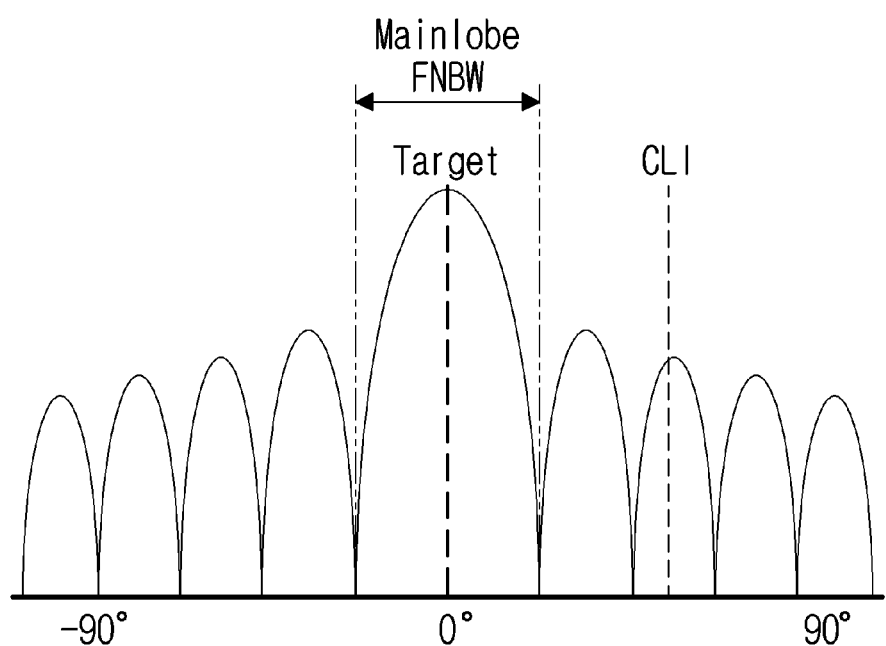
FIG. 21 illustrates an example of a serving beam pattern for a transmitted signal in an aggressor terminal according to an embodiment of the present invention.

FIG. 21 illustrates an example of a serving beam pattern for a transmitted signal in an aggressor terminal according to an embodiment of the present invention.

Referring to FIG. 21, it is possible to identify a beam pattern for a signal to be transmitted at an azimuth angle from −90 degrees to +90 degrees. In a serving beam pattern of a terminal, a full null beam width (FNBW) of a mainlobe is set to a random size, and CLI has an interference effect between +30 degrees and +60 degrees.

In order to reduce the effect of CLI, a null region needs to be formed in the section from +30 degrees to +60 degrees in the serving beam pattern. Hereinafter a procedure of searching for a null region in a transmission beam for forming a null and thus for reducing an interference effect will be described.

Figure 22:
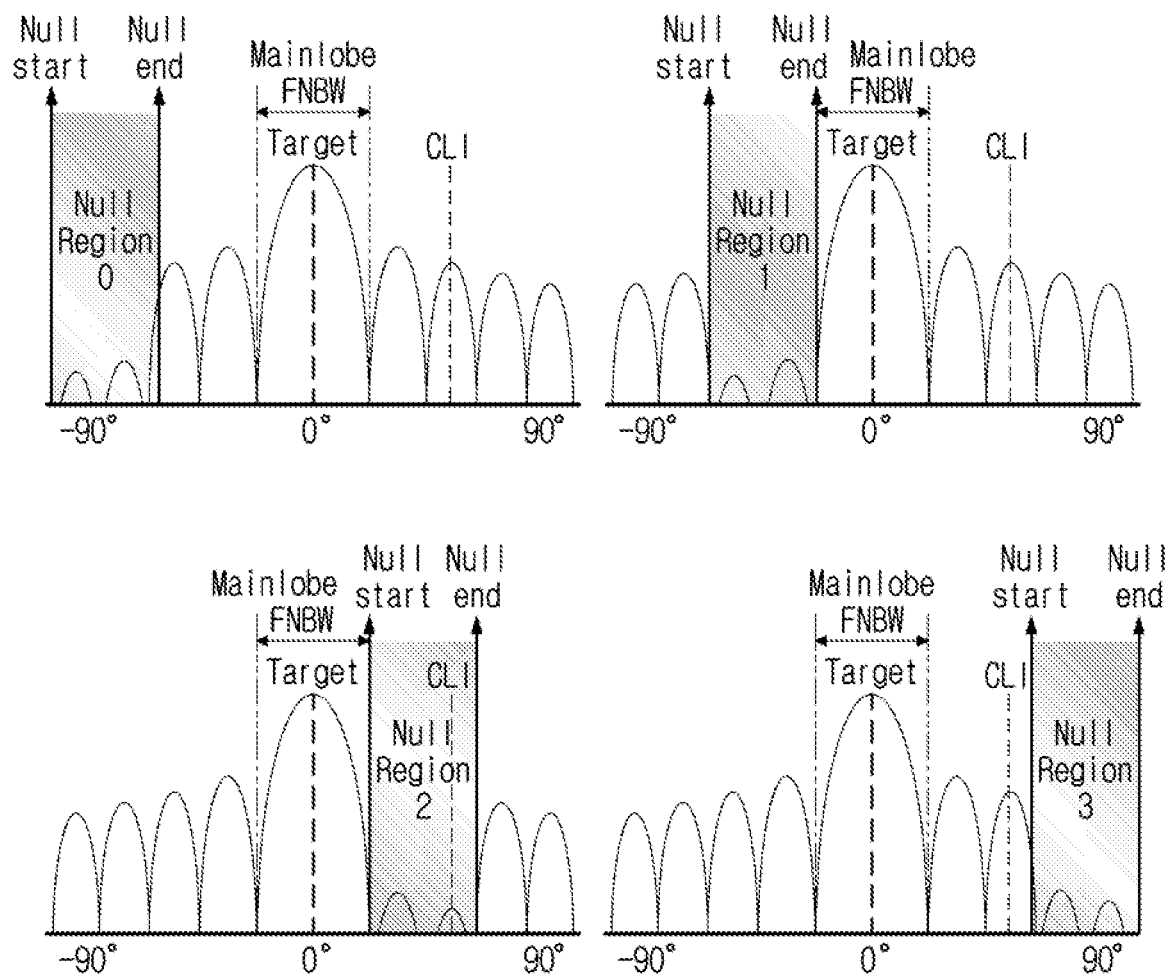
FIG. 22 illustrates an example of searching for a null region in a transmission beam according to an embodiment of the present invention.

FIG. 22 illustrates an example of searching for a null region in a transmission beam according to an embodiment of the present invention.

Referring to FIG. 22, a terminal may search for each null region of a reception beam. As an example, the terminal may search for a null region based on a request of null region search from a base station. Null region search may be a procedure of measuring a region, in which a null is to be formed, in order to reduce an effect of an interference signal caused by a transmission beam. As an example, the terminal may perform measurement for each section obtained by dividing every azimuth angle of a transmission beam pattern according to a certain criterion. The terminal may measure a Null_start value, which is a start point, and a Null_end value, which is an end point, for each of the null regions obtained by dividing every Null_width set by the base station in the transmission beam pattern. As an example, the terminal may measure an SNR value and an SINR value for each null region. Based on information measured for each region, the terminal may create null region measurement information.

The base station may request the null region measurement information to the terminal. As an example, the base station may divide a null region by Null_width, which is set at random, and request Null_start and Null_end of each region to a terminal. As an example, when the base station requests null region measurement information, the terminal may divide a region of a reception beam by using a random value of Null_width received from the base station and may measure information on Null_start and Null_end for each region. An operation of the terminal for performing measurement for a null region at the request of the base station for null region measurement information may not be limited to a specific method. When receiving the null region measurement information from a terminal, the base station may determine a region, in which a null is to be formed, based on the received null region measurement information.

Figure 23:
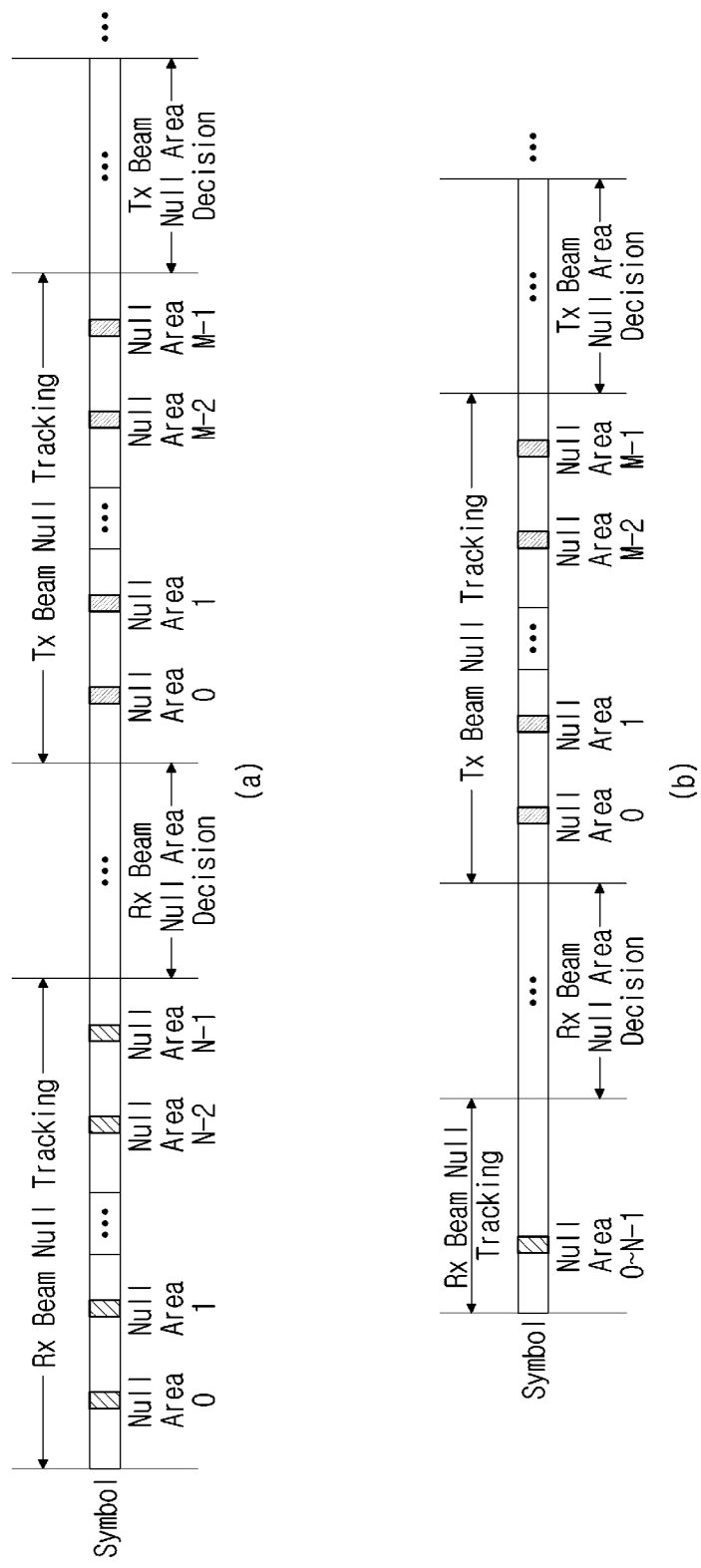
FIG. 23 illustrates an example procedure of searching for a transmission/reception beam null region in time domain according to an embodiment of the present invention.

FIG. 23 illustrates an example procedure of searching for a transmission/reception beam null region in time domain according to an embodiment of the present invention. A beam search procedure should be basically implemented after being time-shared.

(a) of FIG. 23 illustrates a null region search procedure in an analog beamforming scheme. As an example, in (a) of FIG. 23, in case a terminal performs Rx beam null tracking, the terminal may perform Rx beam null tracking based on an analog beam. In this case, it is possible transmit and receive, in the analog beam, signals in a single RF chain through a phase shifter and a signal attenuator adjusted at each antenna element. Accordingly, the terminal needs to search for each beam for forming each null region based on a null forming weight. That is, based on the analog beam, the terminal may apply a null region search for each null forming weight N times based on time sharing. Herein, as an example, N may be set based on a null area, which is set based on the above-described null start, null end and null width, and may not be limited to a specific number. That is, the terminal may determine an optimal null region by performing each null region search N times based on a null forming weight. On the other hand, (b) of FIG. 23 illustrates a null region search procedure in a digital beamforming scheme. As an example, in a digital beam, a RF chain may be put in each antenna element and a phase and an amplitude may be adjusted at a baseband so that measured values for null forming weights may be calculated simultaneously. That is, unlike in (a) of FIG. 23, the terminal may perform a search for each null region simultaneously. Accordingly, the terminal may obtain measured values for each of N null regions at a same time based on a single receiving operation. Herein, as an example, N may be set based on a null area, which is set based on the above-described null start, null end and null width, and may not be limited to a specific number. Herein, the terminal may determine an optimal null region based on each null region by applying a null forming weight.

On the other hand, in the case of a transmission beam, an aggressor terminal may consider M null regions for the transmission beam for null tracking. Herein, M may be set based on a null start, a null end and a null width and may not be limited to a specific number. That is, a victim terminal needs to measure each null region of the M null regions of the transmission beam based on a time-sharing scheme. Specifically, the aggressor terminal may transmit M transmission beams applying different null weights based on a time-sharing scheme. Herein, the victim terminal may also search for a beam in each region where the M transmission beams are transmitted based on the time-sharing scheme.

That is, considering (a) of FIG. 23 and (b) of FIG. 23, null tracking for a reception beam of a victim terminal may be performed differently based on an analog beam scheme and a digital beam scheme, and tracking for a transmission beam of an aggressor terminal may be searched at a point corresponding to each null region based on a time-sharing scheme.

Figure 24:
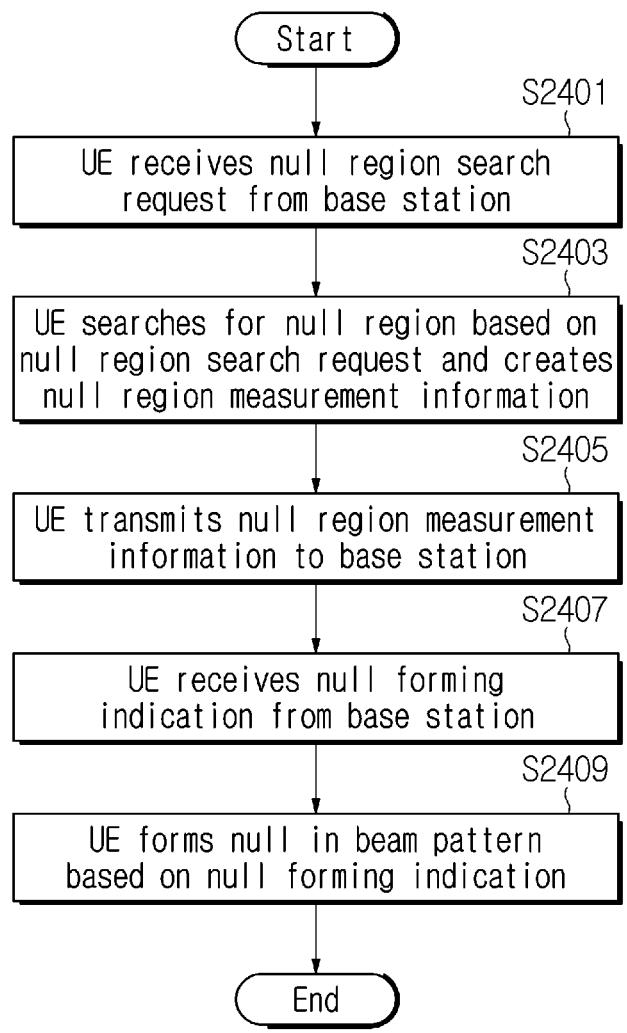
FIG. 24 illustrates an example procedure of reducing an effect of an interference signal through beam null tracking according to an embodiment of the present invention.

FIG. 24 illustrates an example procedure of reducing an effect of an interference signal through beam null tracking according to an embodiment of the present invention.

Referring to FIG. 24, at step S2401, a terminal may receive a null region search request from a base station. Based on information that the terminal measures for a received signal, the base station may determine whether or not there is an interference effect on the terminal. In case the base station determines that there is an interference effect on the terminal, the base station may transmit the null region search request. The measurement information for the received signal of the terminal may include at least one of an SNR value and an SINR measurement value considering CLI.

At step S2403, the terminal may search for a null region based on the null region search request and create null region measurement information. As an example, the terminal may receive information on a null region, for which a search is to be performed, together with the null region search request from the base station. The information on the null region for which the search is to be performed may include information on a size of the null region, information on a start point of the null region and information on an end point. As an example, the terminal may divide a region of a beam pattern by the size of the null region and perform measurement for each null region. As an example, the terminal may measure an SNR value and an SINR value for each null region based on an interference signal that another terminal transmits. Based on a measured result, the terminal may create null region measurement information.

At step S2405, the terminal may transmit the null region measurement information to the base station. As an example, the terminal may transmit each piece of the null region measurement information to the base station by using a standardized table index. Based on the null region measurement information received from the terminal, the base station may determine a region for forming a null in a beam pattern in order to reduce an effect of an interference signal. A beam, in which the null is to be formed, may be a transmission beam of an aggressor terminal or may be a transmission beam of a victim terminal.

At step S2407, the terminal may receive a null forming indication from the base station. The null forming indication is generated based on the null region measurement information that the base station receives from the terminal. As an example, the base station may determine a region, which has a maximized RSSI or SINR value in a beam pattern in which a null is to be formed, as a region in which the null is to be formed, and may order the terminal to form the null. The null forming indication may include at least one of an index indicating a null region in a beam pattern, information on a start point of the null region, and information on an end point of the null region.

At step S2409, the terminal may form the null in the beam pattern based on the null forming indication. As an example, the terminal may form the null in the beam pattern by applying a calculated beam weight.

System and Various Devices, to which Embodiments of the Present Disclosure are Applicable Various embodiments of the present disclosure may be combined with each other.

Hereinafter, a device, to which various embodiments of the present disclosure are applicable, will be described. Although not limited thereto, various descriptions, functions, procedures, proposes, methods and/or operation flowcharts disclosed in the present disclosure are applicable to various fields requiring wireless communication/connection (e.g., 5G) between devices.

Hereinafter, it will be described in greater detail with reference to the drawings. In the following drawings/description, the same reference numerals may denote the same or corresponding hardware blocks, software blocks or functional blocks unless otherwise stated.

Figure 25:
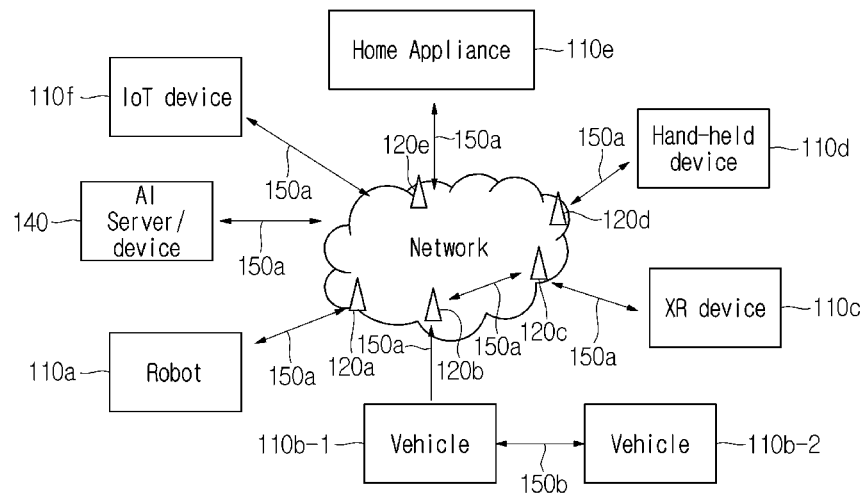
FIG. 25 illustrates an example of a communication system according to an embodiment of the present disclosure.

FIG. 25 illustrates an example of a communication system according to an embodiment of the present disclosure. The embodiment of FIG. 17 may be combined with various embodiments of the present disclosure.

Referring to FIG. 25, a communication system applied to the present disclosure includes a wireless device, a base station and a network. Here, the wireless device means a device for performing communication using radio access technology (e.g., 5G NR or LTE) and may be referred to as a communication/wireless/5G device. Although not limited thereto, the wireless device may include at least one of a robot 110a, vehicles 110b-1 and 110b-2, an extended reality (XR) device 110c, a hand-held device 110d, a home appliance 110e, an Internet of Thing (IoT) device 110f or an artificial intelligence (AI) device/server 110g. For example, the vehicle may include a vehicle having a wireless communication function, an autonomous vehicle, a vehicle capable of performing vehicle-to-vehicle communication or the like. Here, the vehicles 110b-1 and 110b-2 may include an unmanned aerial vehicle (UAV) (e.g., drone). The XR device 110c may include an augmented reality (AR)/virtual reality (VR)/mixed reality (MR) device and may be implemented in the form of a head-mounted device (HMD), a head-up display provided in a vehicle, a television, a smartphone, a computer, a wearable device, a home appliance, a digital signage, a vehicle, a robot, etc. The hand-held device 110d may include a smartphone, a smart pad, a wearable device (e.g., a smartwatch or smart glasses), a computer (e.g., a laptop, etc.), etc. The home appliance 110e may include a TV, a refrigerator, a washing machine, etc. The IoT device 110f may include a sensor, a smart meter, etc. For example, the base stations 120a to 120e and the network may be implemented by a wireless device, and the specific wireless device 120a may operate as a base station/network node for the other wireless devices.

Here, wireless communication technology implemented in the wireless devices 110a to 110f of this disclosure may include not only LTE, NR and 6G but also narrowband Internet of things for low-power communication. In this case, for example, NB-IoT technology may be an example of LPWAN (Low Power Wide Area Network) technology and may be implemented in the standard such as LTE Cat NB1 and/or LTE Cat NB2, without being limited to the above-described names. Additionally or alternatively, the wireless communication technology implemented in the wireless devices 110a to 110f of this disclosure may perform communication based on LTE-M technology. In this case, for example, the LTE-M technology may be an example of LPWAN technology, and may be referred to as various names such as eMTC (enhanced Machine Type Communication). For example, the LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, without being limited to the above-described names. Additionally or alternatively, the wireless communication technology implemented in the wireless devices 110a to 110f of this disclosure may include at least one of ZigBee considering low-power communication, Bluetooth or low power wide area network (LPWAN), without being limited to the above-described names. For example, the ZigBee technology may generate personal area networks (PANs) related to small/low-power digital communication based on various standards such as IEEE 802.15.4 and may be referred to as various names.

The wireless devices 110a to 110f may be connected to the network through the base station 120a to 120e. AI technology is applicable to the wireless devices 110a to 110f, and the wireless devices 110a to 110f may be connected to the AI server 110g through the network. The network may be configured using a 3G network, a 4G (e.g., LTE) network, a 5G (e.g., NR) network, etc. The wireless devices 110a to 110f may communicate with each other through the base station 120a to 120e/network, or may perform direct communication (e.g., sidelink communication) without the base station 120a to 120e/network. For example, the vehicles 110b-1 and 110b-2 may perform direct communication (e.g., V2V (vehicle to vehicle)/V2X (vehicle to everything) communication). In addition, the IoT device 110f (e.g., a sensor) may perform direct communication with another IoT device (e.g., a sensor) or the other wireless devices 110a to 110f.

Wireless communication/connection 150a, 150b or 150c may be performed/established between the wireless devices 110a to 110f/base station 120a to 120e and the base station 120a to 120e/base station 120a to 120e. Here, wireless communication/connection may be performed/established through various radio access technologies (e.g., 5G NR) such as uplink/downlink communication 150a, sidelink communication 150b (or D2D communication) or BS-to-BS communication 150c (e.g., relay or integrated access backhaul (IAB)). The wireless device and the base station/wireless device or the base station and the base station may transmit/receive radio signals to/from each other through wireless communication/network 150a, 150b or 150c. For example, wireless communication/network 150a, 150b or 150c may enable signal transmission/reception through various physical channels. To this end, based on various proposes of the present disclosure, at least some of various configuration information setting processes for transmission/reception of radio signals, various signal processing procedures (e.g., channel encoding/decoding, modulation/demodulation, resource mapping/demapping, etc.) or resource allocation processes may be performed.

Figure 26:
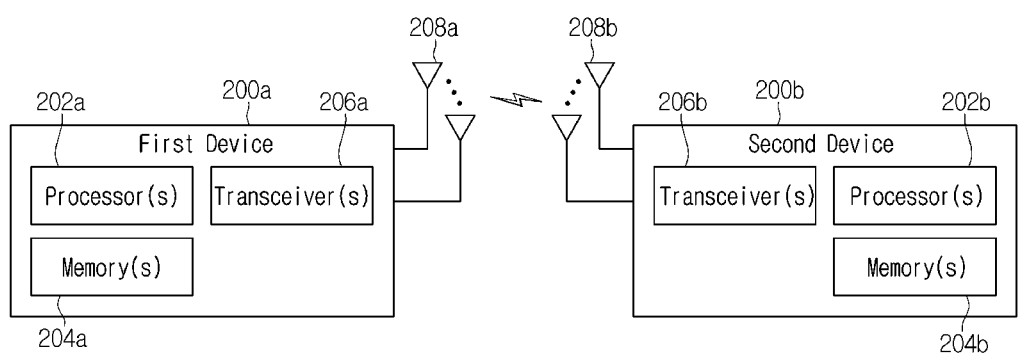
FIG. 26 illustrates an example of a wireless device according to an embodiment of the present disclosure.

FIG. 26 illustrates an example of a wireless device according to an embodiment of the present disclosure.

Referring to FIG. 26, a first wireless device 200a and a second wireless device 200b may transmit/receive radio signals through various radio access technologies (e.g., LTE or NR). Here, {the first wireless device 200a and the second wireless device 200b} may correspond to {the wireless device 110x and the base station 120x} and/or {the wireless device 110x and the wireless device 110x} of FIG. 1.

The first wireless device 200a includes one or more processors 202a and one or more memories 204a and may further include one or more transceivers 206a and/or one or more antennas 208a. The processor 202a may be configured to control the memory 204a and/or the transceiver 206a and to implement the descriptions, functions, procedures, proposes, methods and/or operation flowcharts disclosed in the present disclosure. For example, the processor 202a may process information in the memory 204a to generate first information/signal and then transmit a radio signal including the first information/signal through the transceiver 206a. In addition, the processor 202a may receive a radio signal including second information/signal through the transceiver 206a and thus store information obtained from signal processing of the second information/signal in the memory 204a. The memory 204a may be connected to the processor 202a to store a variety of information related to operation of the processor 202a. For example, the memory 204a may perform some or all of the processes controlled by the processor 202a or store software code including commands for performing the descriptions, functions, procedures, proposes, methods and/or operation flowcharts disclosed in the present disclosure. Here, the processor 202a and the memory 204a may be a portion of a communication modem/circuit/chip designed to implement wireless communication technology (e.g., LTE or NR). The transceiver 206a may be connected to the processor 202a to transmit and/or receive radio signals through one or more antennas 208a. The transceiver 206a may include a transmitter and/or a receiver. The transceiver 206a may be used interchangeably with a radio frequency (RF) unit. In the present disclosure, the wireless device may mean a communication modem/circuit/chip.

The second wireless device 200b performs wireless communication with the first wireless device 200a, includes one or more processors 202b and one or more memories 204b and may further include one or more transceivers 206b and/or one or more antennas 208b. The functions of the one or more processors 202b, the one or more memories 204b, the one or more transceivers 206b and/or the one or more antennas 208b are similar to those of the one or more processors 202a, the one or more memories 204a, the one or more transceivers 206a and/or the one or more antennas 208a of the first wireless device 200a.

Hereinafter, the hardware elements of the wireless devices 200a and 200b will be described in greater detail. Although not limited thereto, one or more protocol layers may be implemented by one or more processors 202a and 202b. For example, the one or more processors 202a and 202b may implement one or more layers (e.g., functional layers such as PHY (physical), MAC (media access control), RLC (radio link control), PDCP (packet data convergence protocol), RRC (radio resource control), SDAP (service data adaptation protocol)). The one or more processors 202a and 202b may generate one or more protocol data units (PDUs), one or more service data units (SDUs), messages, control information, data or information according to the descriptions, functions, procedures, proposes, methods and/or operation flowcharts disclosed in the present disclosure. The one or more processors 202a and 202b may generate and provide signals (e.g., baseband signals) including the PDUs, the SDUs, the messages, the control information, the data or the information to the one or more transceivers 206a and 206b according to the functions, procedures, proposes and/or methods disclosed in the present disclosure. The one or more processors 202a and 202b may receive signals (e.g., baseband signals) from one or more transceivers 206a and 206b to obtain the PDUs, the SDUs, the messages, the control information, the data or the information according to the descriptions, functions, procedures, proposes, methods and/or operation flowcharts disclosed in the present disclosure.

The one or more processors 202a and 202b may be referred to as controllers, microcontrollers or microcomputers. The one or more processors 202a and 202b may be implemented by hardware, firmware, software or a combination thereof. For example, one or more ASICs (application specific integrated circuits), one or more DSPs (digital signal processors), one or more DSPDs (digital signal processing devices), one or more PLDs (programmable logic devices) or one or more FPGAs (field programmable gate arrays) may be included in the one or more processors 202a and 202b. The descriptions, functions, procedures, proposes, methods and/or operation flowcharts disclosed in the present disclosure may be implemented using firmware or software, and the firmware or software may be implemented to include modules, procedures, functions, etc. The firmware or software configured to perform descriptions, functions, procedures, proposes, methods and/or operation flowcharts disclosed in the present disclosure may be included in the one or more processors 202a and 202b or stored in the one or more memories 204a and 204b and driven by the one or more processors 202a and 202b. The descriptions, functions, procedures, proposes, methods and/or operation flowcharts disclosed in the present disclosure may be implemented using firmware or software in the form of code, a command and/or a set of commands.

The one or more memories 204a and 204b may be connected to the one or more processors 202a and 202b to store various types of data, signals, messages, information, programs, code, instructions and/or commands. The one or more memories 204a and 204b may include a ROM (read only memory), a RAM (random access memory), an EPROM (erasable programmable read only memory), a flash memory, a hard drive, a register, a cache memory, a computer-readable storage medium and/or a combination thereof. The one or more memories 204a and 204b may be located inside and/or outside the one or more processors 202a and 202b. In addition, the one or more memories 204a and 204b may be connected to the one or more processors 202a and 202b through various technologies such as wired or wireless connection.

The one or more transceivers 206a and 206b may transmit, to one or more other devices, user data, control information, radio signals/channels, etc. described in the methods and/or operation flowcharts of the present disclosure. The one or more transceivers 206a and 206b may receive, from one or more other devices, user data, control information, radio signals/channels, etc. described in the descriptions, functions, procedures, proposes, methods and/or operation flowcharts disclosed in the present disclosure. In addition, the one or more transceivers 206a and 206b may be connected to the one or more antennas 208a and 208b and may be configured to transmit/receive user data, control information, radio signals/channels, etc. described in the descriptions, functions, procedures, proposes, methods and/or operation flowcharts disclosed in the present disclosure through the one or more antennas 208a and 208b. In the present disclosure, one or more antennas may be a plurality of physical antennas or a plurality of logical antennas (e.g., antenna ports). The one or more transceivers 206a and 206b may convert the received radio signals/channels, etc. from RF band signals to the baseband signals, in order to process the received user data, control information, radio signals/channels, etc. using the one or more processors 202a and 202b. The one or more transceivers 206a and 206b may convert the user data, control information, radio signals/channels, etc. processed using the one or more processors 202a and 202b from a baseband signal to an RF band signal. To this end, the one or more transceivers 206a and 206b may include an (analog) oscillator and/or a filter.

Figure 27:
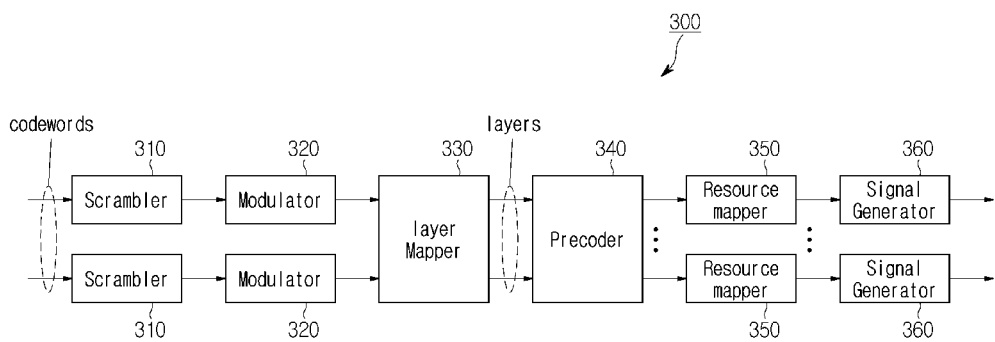
FIG. 27 illustrates a circuit for processing a transmitted signal according to an embodiment of the present disclosure

FIG. 27 illustrates a circuit for processing a transmitted signal according to an embodiment of the present disclosure. The embodiment of FIG. 19 may be combined with various embodiments of the present disclosure.

Referring to FIG. 27, a signal processing circuit 300 may include a scrambler 310, a modulator 320, a layer mapper 330, a precoder 340, a resource mapper 350 and a signal generator 360. In this case, for example, the operation/function of FIG. 19 may be performed by the processors 202a and 202b and/or the transceivers 206a and 206b of FIG. 18. In addition, for example, the hardware element of FIG. 19 may be implemented in the processors 202a and 202b and/or the transceivers 206a and 206b of FIG. 18. For example, blocks 310 to 360 may be implemented in the processors 202a and 202b of FIG. 18. Alternatively, the blocks 310 to 350 may be implemented in the processors 202a and 202b of FIG. 18 and the block 360 may be implemented in the transceivers 206a and 206b of FIG. 18, without being limited to the above-described embodiment.

The codeword may be converted into a radio signal through the signal processing circuit 300 of FIG. 19. Here, the codeword is a coded bit sequence of an information block. The information block may include a transport block (e.g., a UL-SCH transport block or a DL-SCH transport block). The radio signal may be transmitted through various physical channels (e.g., a PUSCH and a PDSCH) of FIG. 19. Specifically, the codeword may be converted into a bit sequence scrambled by the scrambler 310. The scramble sequence used for scramble is generated based on an initialization value and the initialization value may be included in ID information, etc. of the wireless device. The scrambled bit sequence may be modulated to a modulation symbol sequency by the modulator 320. A modulation scheme may include pi/2-BPSK(pi/2-binary phase shift keying), m-PSK (m-phase shift keying), m-QAM(m-quadrature amplitude modulation), etc.

A complex modulation symbol sequence may be mapped to one or more transport layers by the layer mapper 330. The modulation symbols of each transport layer may be mapped to the corresponding antenna port(s) by the precoder 340 (precoding). The output z of the precoder 340 may be obtained by multiplying the output y of the layer mapper 330 by a N*M precoding matrix W. Here, N is the number of antenna ports and M is the number of transport layers. Here, the precoder 340 may perform precoding after performing transform precoding (e.g., discrete Fourier transform (DFT) with respect to complex modulation symbols. In addition, the precoder 340 may perform precoding without performing transform precoding.

The resource mapper 350 may map the modulation symbols of each antenna port to time-frequency resources. The time-frequency resources may include a plurality of symbols (e.g., CP-OFDMA symbols and DFT-s-OFDMA symbols) in the time domain and include a plurality of subcarriers in the frequency domain. The signal generator 360 may generate a radio signal from the mapped modulation symbols and transmit the generated radio signal to another device through each antenna. To this end, the signal generator 360 may include an inverse fast Fourier transform (IFFT) module and a cyclic prefix (CP) inserter, a digital-to-analog converter (DAC), a frequency uplink converter, etc.

A signal processing procedure for a received signal in a wireless device may be performed inversely to the signal processing procedure of FIG. 19. For example, the wireless device (e.g., 200*a* and 200*b* of FIG. 18) may receive a radio signal from the outside through an antenna port/transceiver. The received radio signal may be converted into a baseband signal through a signal restorer. To this end, the signal restorer may include a frequency downlink converter, an analog-to-digital converter (ADC), a CP remover and a fast Fourier transform (FFT) module. Thereafter, the baseband signal may be restored to a codeword through a resource de-mapper processor, a postcoding processor, a demodulation process and a de-descramble process. The codeword may be restored to an original information block through decoding. Accordingly, a signal processing circuit (not shown) for the received signal may include a signal restorer, a resource de-mapper, a postcoder, a demodulator, a descrambler and a decoder.

Figure 28:
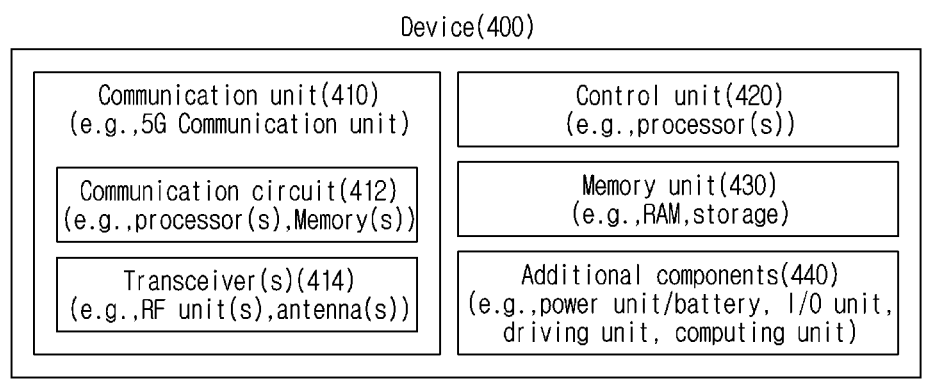
FIG. 28 illustrates another example of a wireless device according to an embodiment of the present disclosure.

FIG. 28 illustrates another example of a wireless device according to an embodiment of the present disclosure. The embodiment of FIG. 28 may be combined with various embodiments of the present disclosure.

Referring to FIG. 28, the wireless device 300 corresponds to the wireless devices 200*a* and 200*b* of FIG. 18 and may include various elements, components, units and/or modules. For example, the wireless device 400 may include a communication unit 410, a control unit 420, a memory unit 430 and additional components 440.

The communication unit 410 may include a communication circuit 412 and transceiver(s) 414. The communication unit 410 may transmit and receive signals (e.g., data, control signals, etc.) to and from other wireless devices or base stations. For example, the communication circuit 412 may include the one or more processors 202*a* and 202*b* and/or the one or more memories 204*a* and 204*b* of FIG. 18. For example, the transceiver(s) 414 may include the one or more transceivers 206*a* and 206*b* and/or the one or more antennas 208*a* and 208*b* of FIG. 18.

The control unit 420 may consist of a set of one or more processors. For example, the control unit 420 may consist of a set of a communication control processor, an application processor (AP), an electronic control unit (ECU), a graphics processor and a memory control processor. The control unit 420 may be electrically connected to the communication unit 410, the memory unit 430 and the additional components 440 to control overall operation of the wireless device. For example, the control unit 420 may control electrical/mechanical operation of the wireless device based on the program/code/command/information stored in the memory unit 430. In addition, the control unit 420 may transmit the information stored in the memory unit 430 to the outside (e.g., another communication device) through the communication unit 410 using a wireless/wired interface or store, in the memory unit 430, the information received from the outside (e.g., another communication device) through the communication unit 410 using a wireless/wired interface.

The memory unit 430 may include a RAM, a DRAM (dynamic RAM), a ROM, a flash memory, a volatile memory, a non-volatile memory and/or a combination thereof. The memory unit 430 may store data/parameters/programs/code/commands necessary to drive the wireless device 400. In addition, the memory unit 430 may store input/output data/information, etc.

The additional components 440 may be variously configured according to the type of the wireless device. For example, the additional components 440 may include at least one of a power unit/battery, an input/output unit, a driving unit or a computing unit. Although not limited thereto, the wireless device 400 may be implemented in the form of a robot (FIG. 1, 110*a*), a vehicle (FIGS. 1, 110*b*-1 and 110*b*-2), an XR device (FIG. 1, 110*c*), a hand-held device (FIG. 1, 110*d*), a home appliance (FIG. 1, 110*e*), an IoT device (FIG. 1, 110*f*), a digital broadcast terminal, a hologram device, a public safety device, an MTC device, a medical device, a Fintech device (or a financial device), a security device, a climate/environment device, an AI server/device (FIG. 1, 140), or a network node. The wireless device is movable or may be used at a fixed place according to the use example/service.

Figure 29:
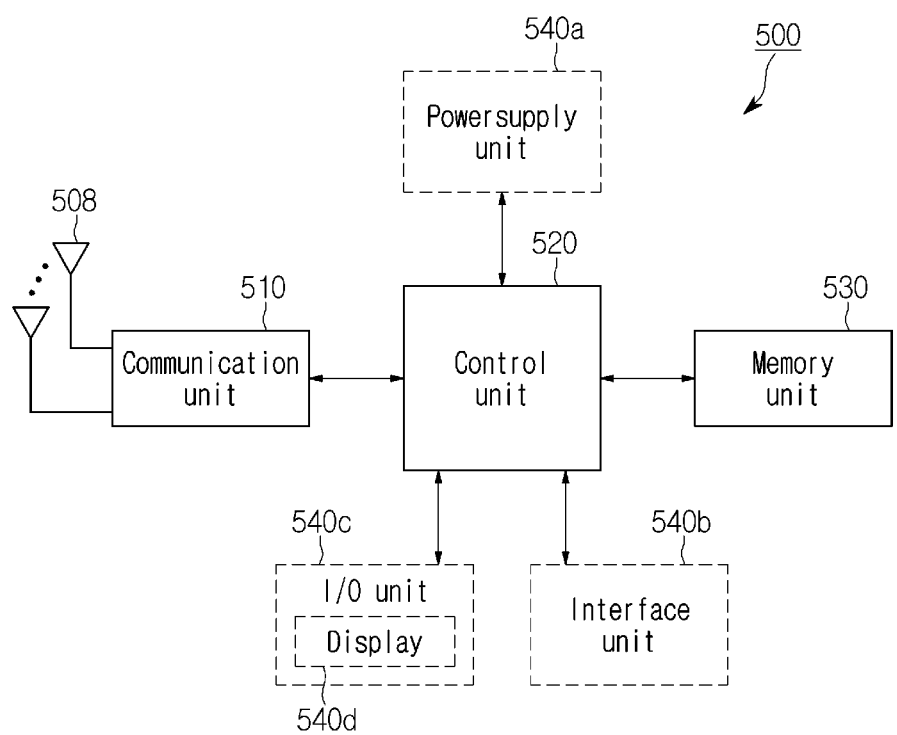
FIG. 29 illustrates an example of a hand-held device according to an embodiment of the present disclosure

FIG. 29 illustrates an example of a hand-held device according to an embodiment of the present disclosure. FIG. 29 shows a hand-held device applied to the present disclosure. The hand-held device may include a smartphone, a smart pad, a wearable device (e.g., a smartwatch or smart glasses), a portable computer (e.g., a laptop), etc. The embodiment of FIG. 21 may be combined with various embodiments of the present disclosure.

Referring to FIG. 29, the hand-held device 500 may include an antenna unit 508, a communication unit 510, a control unit 530, a power supply unit 540*a*, an interface unit 540*b* and an input/output unit 540*c*. The antenna unit 508 may be a portion of the communication unit 510. Blocks 510 to 530/540*a* to 540*c* may respectively correspond to the blocks 410 to 430/440 of FIG. 20 and a repeated description thereof will be omitted.

The communication unit 510 may transmit and receive signals, the control unit 520 may control the hand-held device 500, and the memory unit 530 may store data, etc. The power supply unit 540*a* may supply power to the hand-held device 500 and include a wired/wireless charging circuit, a battery, etc. The interface unit 540*b* may support connection between the hand-held device 500 and another external device. The interface unit 540*b* may include various ports (e.g., an audio input/output port and a video input/output port) for connection with the external device. The input/output unit 540*c* may receive or output image video information/signals, audio information/signals, data and/or information received from a user. The input/output unit 540*c* may include a camera, a microphone, a user input unit, a display 540*d*, a speaker and/or a haptic module.

For example, in the case of data communication, the input/output unit 540*c* may obtain information/signals (e.g., touch, text, voice, image or video) received from the user and store the obtained information/signals in the memory unit 530. The communication unit 510 may convert the information/signals stored in the memory into radio signals and transmit the converted radio signals to another wireless device directly or to the base station. In addition, the communication unit 510 may receive the radio signals from another wireless device or the base station and then restore the received radio signals into original information/signals. The restored information/signals may be stored in the memory unit 530 and then output through the input/output unit 540c in various forms (e.g., text, voice, image, video or haptic).

Figure 30:
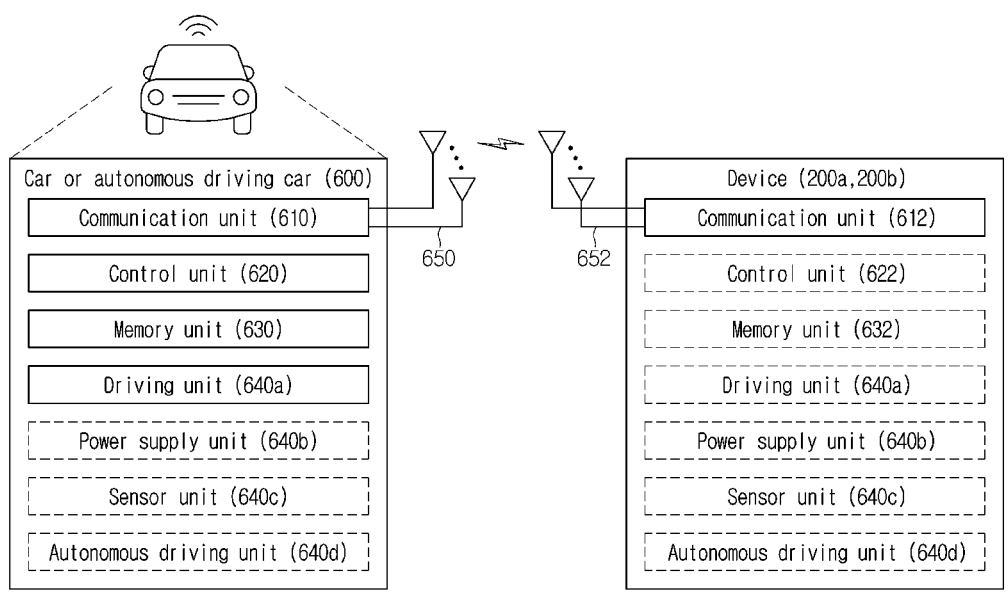
FIG. 30 illustrates an example of a vehicle or an autonomous vehicle according to an embodiment of the present disclosure.

FIG. 30 illustrates an example of a vehicle or an autonomous vehicle according to an embodiment of the present disclosure. FIG. 30 shows a vehicle or an autonomous vehicle applied to the present disclosure. The vehicle or autonomous vehicle may be implemented by a mobile robot, a car, a train, a manned/unmanned Aerial Vehicle (AV), a ship, etc., but the shape of the vehicle is not limited. The embodiment of FIG. 30 may be combined with various embodiments of the present disclosure.

Referring to FIG. 30, a vehicle or autonomous vehicle 600 may include an antenna unit 608, a communication unit 610, a control unit 620, a driving unit 640a, a power supply unit 640b, a sensor unit 640c, and an autonomous driving unit 640d. The antenna unit 608 may be configured as a part of the communication unit 610. The blocks 610/630/640a-640d correspond to the blocks 510/530/540 of FIG. 21, respectively, and a repeated description thereof will be omitted.

The communication unit 610 may transmit and receive signals (e.g., data and control signals) to and from external devices such as other vehicles, BSs (e.g., gNBs and road side units), and servers. The control unit 620 may perform various operations by controlling elements of the vehicle or the autonomous vehicle 600. The control unit 620 may include an Electronic Control Unit (ECU). The driving unit 640a may cause the vehicle or the autonomous vehicle 600 to drive on a road. The driving unit 640a may include an engine, a motor, a powertrain, a wheel, a brake, a steering device, etc. The power supply unit 640b may supply power to the vehicle or the autonomous vehicle 600 and include a wired/wireless charging circuit, a battery, etc. The sensor unit 640c may obtain a vehicle state, ambient environment information, user information, etc. The sensor unit 640c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 640d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 610 may receive map data, traffic information data, etc., from an external server. The autonomous driving unit 640d may generate an autonomous driving path and a driving plan from the obtained data. The control unit 620 may control the driving unit 640a such that the vehicle or the autonomous vehicle 600 may move along the autonomous driving path according to the driving plan (e.g., speed/direction control). In the middle of autonomous driving, the communication unit 610 may aperiodically/periodically obtain recent traffic information data from the external server and obtain surrounding traffic information data from neighboring vehicles. In the middle of autonomous driving, the sensor unit 640c may obtain a vehicle state and/or surrounding environment information. The autonomous driving unit 640d may update the autonomous driving path and the driving plan based on the newly obtained data/information. The communication unit 610 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

The embodiments of the present disclosure have the following effects.

According to the present disclosure, it is possible to efficiently maintain self-interference cancellation performance of a certain level or more in a UE performing full duplex radio (FDR) communication.

The effects of the present disclosure are not limited to the above-described effects and other effects which are not described herein may be derived by those skilled in the art from the description of the embodiments of the present disclosure. That is, effects which are not intended by the present disclosure may be derived by those skilled in the art from the embodiments of the present disclosure.

Since examples of the above-described proposed method may also be included as one of the implementation methods of the present disclosure, it is obvious that they may be regarded as a kind of proposed method. In addition, the above-described proposed methods may be implemented independently, but may be implemented in the form of a combination (or merge) of some of the proposed methods. The rule can be defined so that the base station informs the UE of information indicating whether the proposed methods are applicable (or information on the rules of the proposed methods) through a predefined signal (e.g., a physical layer signal or a higher layer signal).

The present disclosure may be embodied in other specific forms without departing from the technical idea and essential features described in the present disclosure. Therefore, the detailed description above should not be construed as restrictive in all respects and should be considered as illustrative. The scope of the present disclosure should be determined by reasonable interpretation of the appended claims, and all changes within the equivalent scope of the present disclosure are included in the scope of the present disclosure. In addition, the embodiments may be configured by combining claims that do not have an explicit citation relationship in the claims, or new claims may be included by amendment after the application is filed.

What is claimed is:

1. A method for operating a user equipment (UE) in a wireless communication system, the method comprising:
   receiving information on a beam pattern from a base station;
   generating measurement information based on the information on the beam pattern;
   transmitting the measurement information to the base station;
   receiving beam pattern information based on the measurement information from the base station; and
   forming a beam based on the received beam pattern information,
   wherein the information on the beam pattern comprises a null region search request for ordering to perform measurement in order to obtain information necessary to form a null in the beam pattern,
   wherein the measurement information is measurement information for a null region, which is generated after a search and measurement for the null region is performed based on the null region search request, wherein the beam pattern information comprises a null forming indication based on the measurement information, and wherein the null region is a section of the beam pattern, which is classified in the beam pattern according to a random value set by the base station.

2. The method of claim 1, wherein the beam pattern comprises at least one of a beam pattern transmitted by an aggressor UE and a beam pattern received by a victim UE.

3. The method of claim 1, wherein the null region measurement information comprises at least one of an index indicating a null region (a null region index), a width of a null region (a null width), and a signal to interference plus noise ratio (SINR) value and a received signal strength indication (RSSI) value for each null region.

4. The method of claim 1, wherein the null region search request of the base station is transmitted to the UE based on a difference value between a signal to noise ratio (SNR) and a signal to interference plus noise ratio (SINR) for a received signal of the UE.

5. The method of claim 1, wherein the null region measurement information is generated after the null region search is performed based on a calculated value of a weight for forming a null in a specific region of the beam pattern.

6. The method of claim 1, wherein the null region measurement information is generated by a victim UE based on an effect of a signal that an aggressor UE including cross link interference (CLI) transmits.

7. The method of claim 1, wherein the null region is determined by the base station based on at least one of beam information of an aggressor UE and location information between the aggressor UE and a victim UE.

8. The method of claim 1, wherein the null forming indication comprises at least one of an index indicating a null region, information on a start point of a region in which a null is to be formed, and information on an end point of the region in which a null is to be formed.

9. The method of claim 8, wherein the null forming indication is determined based on at least one of a received signal strength indication (RSSI) value and a signal to interference plus noise ratio (SINR) value, which are measured in the null region of the beam pattern respectively.

10. A method for operating a base station in a wireless communication system, the method comprising:
transmitting information on a beam pattern to a user equipment (UE);
receiving, from the UE, measurement information generated based on the information on the beam pattern; and
transmitting beam pattern information to the UE based on the received measurement information;
wherein the information on the beam pattern comprises a null region search request for ordering to perform measurement in order to obtain information necessary to form a null in the beam pattern,
wherein the measurement information is measurement information for a null region, which is generated after a search and measurement for the null region is performed based on the null region search request,
wherein the beam pattern information comprises a null forming indication based on the measurement information, and
wherein the null region is a section of the beam pattern, which is classified in the beam pattern according to a random value set by the base station.

11. A user equipment (UE) in a wireless communication system, the UE comprising:
a transceiver; and
a processor coupled with the transceiver,
wherein the processor is configured, in a method for operating the UE in the wireless communication system, to:
receive information on a beam pattern from a base station,
generate measurement information based on the information on the beam pattern,
transmit the measurement information to the base station,
receive beam pattern information based on the measurement information from the base station, and
form a beam based on the received beam pattern information,
wherein the information on the beam pattern comprises a null region search request for ordering to perform measurement in order to obtain information necessary to form a null in the beam pattern,
wherein the measurement information is measurement information for a null region, which is generated after a search and measurement for the null region is performed based on the null region search request,
wherein the beam pattern information comprises a null forming indication based on the measurement information, and
wherein the null region is a section of the beam pattern, which is classified in the beam pattern according to a random value set by the base station.

\* \* \* \* \*